United States Patent
Faulkner

(10) Patent No.: US 12,374,054 B2
(45) Date of Patent: Jul. 29, 2025

(54) AUTOMATION OF AUDIO AND VIEWING PERSPECTIVES FOR BRINGING FOCUS TO RELEVANT ACTIVITY OF A COMMUNICATION SESSION

(71) Applicant: MICROSOFT TECHNOLOGY LICENSING, LLC, Redmond, WA (US)

(72) Inventor: Jason Thomas Faulkner, Seattle, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 0 days.

(21) Appl. No.: 17/827,618

(22) Filed: May 27, 2022

(65) Prior Publication Data
US 2023/0386145 A1    Nov. 30, 2023

(51) Int. Cl.
*G06T 19/00* (2011.01)
*H04L 65/1066* (2022.01)
*H04L 65/403* (2022.01)

(52) U.S. Cl.
CPC .......... *G06T 19/006* (2013.01); *G06T 19/003* (2013.01); *H04L 65/1066* (2013.01); *H04L 65/403* (2013.01)

(58) Field of Classification Search
CPC . G06T 19/006; G06T 19/003; H04L 65/1066; H04L 65/403
See application file for complete search history.

(56) References Cited

U.S. PATENT DOCUMENTS

| | | |
|---|---|---|
| 7,006,616 B1 | 2/2006 | Christofferson et al. |
| 9,819,877 B1 | 11/2017 | Faulkner et al. |
| 10,592,013 B2 | 3/2020 | Mandel-iaia et al. |
| 11,682,164 B1 | 6/2023 | Krol et al. |
| 11,689,696 B2 | 6/2023 | Lin |
| 2010/0153497 A1 | 6/2010 | Sylvain et al. |
| 2014/0163982 A1 | 6/2014 | Daborn et al. |
| 2015/0304366 A1* | 10/2015 | Bader-Natal ........ H04L 65/1096 348/14.03 |

(Continued)

FOREIGN PATENT DOCUMENTS

| | | |
|---|---|---|
| WO | 2021257868 A1 | 12/2021 |
| WO | 2022066642 A1 | 3/2022 |

OTHER PUBLICATIONS

"Non Final Office Action Issued in U.S. Appl. No. 17/824,869", Mailed Date: Jul. 25, 2023, 12 Pages.

(Continued)

*Primary Examiner* — Michelle Chin
(74) *Attorney, Agent, or Firm* — Scott Y. Shigeta; Newport IP, LLC

(57) ABSTRACT

The techniques disclosed herein enable systems to guide a user's attention to relevant activity of a communication session displayed in a 3D environment. The system can control a viewing perspective of a 3D environment to focus on specific avatars that are relevant to a user viewing the activity. The system can also control audio signals from remote users of a communication session to enable the viewer to focus on relevant discussions and other audio content. For example, when a particular group of remote users control their avatars to look at the user's avatar or name the user in a conversation, the system can obscure a view of other avatars to bring focus on that particular group of remote users. By directing visual and audio perspectives, a system can help the user navigate through activity of large groups of participants using 3D representatives of a 3D environment to communicate.

20 Claims, 17 Drawing Sheets

(56) References Cited

U.S. PATENT DOCUMENTS

| | | | |
|---|---|---|---|
| 2017/0053542 A1* | 2/2017 | Wilson | G09B 19/003 |
| 2017/0372505 A1 | 12/2017 | Bhat | |
| 2018/0278891 A1 | 9/2018 | Pan | |
| 2019/0332189 A1 | 10/2019 | Mandel-iaia et al. | |
| 2020/0184701 A1 | 6/2020 | Chand | |
| 2021/0027511 A1 | 1/2021 | Shang | |
| 2021/0349604 A1 | 11/2021 | Van Wie | |
| 2021/0392175 A1 | 12/2021 | Gronau | |
| 2022/0066620 A1 | 3/2022 | Anderson et al. | |
| 2022/0086203 A1 | 3/2022 | Morris et al. | |
| 2022/0124286 A1* | 4/2022 | Punwani | G06F 3/04815 |
| 2022/0214743 A1* | 7/2022 | Dascola | G06F 3/011 |
| 2022/0374136 A1 | 11/2022 | Chang et al. | |
| 2022/0393997 A1* | 12/2022 | Hong | G06F 3/0486 |
| 2023/0135075 A1* | 5/2023 | Springer | H04L 65/403 |
| | | | 348/14.03 |
| 2023/0164298 A1 | 5/2023 | Khot | |
| 2023/0206531 A1 | 6/2023 | Agura et al. | |
| 2023/0222721 A1 | 7/2023 | Chen | |
| 2023/0388355 A1 | 11/2023 | Faulkner | |
| 2023/0388357 A1 | 11/2023 | Faulkner | |

OTHER PUBLICATIONS

"International Search Report and Written Opinion Issued in PCT Application No. PCT/US23/018396", Mailed Date: Jul. 14, 2023, 11 Pages.

"International Search Report and Written Opinion Issued in PCT Application No. PCT/US23/019181", Mailed Date: Aug. 2, 2023, 11 Pages.

"International Search Report and Written Opinion Issued in PCT Application No. PCT/US23/018798", Mailed Date: Aug. 10, 2023, 15 Pages.

"Non Final Office Action Issued in U.S. Appl. No. 17/827,588", Mailed Date: Sep. 15, 2023, 23 Pages.

Non-Final Office Action mailed on Apr. 8, 2024, in U.S. Appl. No. 17/824,869, 13 pages.

Tim Fisher, "How to Create a Loomie 3D Avatar For All Your Zoom Meetings", Beat Zoom fatigue with an animated version of you— Lifewise Tech for Humans, Retrieved from: https://www.lifewire.com/create-3d-avatar-loomie-5075012#:-:text=Otherwise%2C%20choose%20the%20settings%20button, avatar%20in%20place%20of%20you, Feb. 15, 2021, 10 pages.

U.S. Appl. No. 17/824,869, filed May 25, 2022.

U.S. Appl. No. 17/827,588, filed May 27, 2022.

Final Office Action mailed on Jun. 7, 2024, in U.S. Appl. No. 17/827,588, 26 pages.

Notice of Allowance mailed on Aug. 26, 2024, in U.S. Appl. No. 17/824,869, 07 pages.

Non-Final office action mailed on Sep. 23, 2024, in U.S. Appl. No. 17/827,588, 30 pages.

Notice of Allowance mailed on Oct. 3, 2024, in U.S. Appl. No. 17/824,869, 7 pages.

Corrected Notice of Allowability mailed on Nov. 4, 2024, in U.S. Appl. No. 17/824,869, 8 pages.

\* cited by examiner

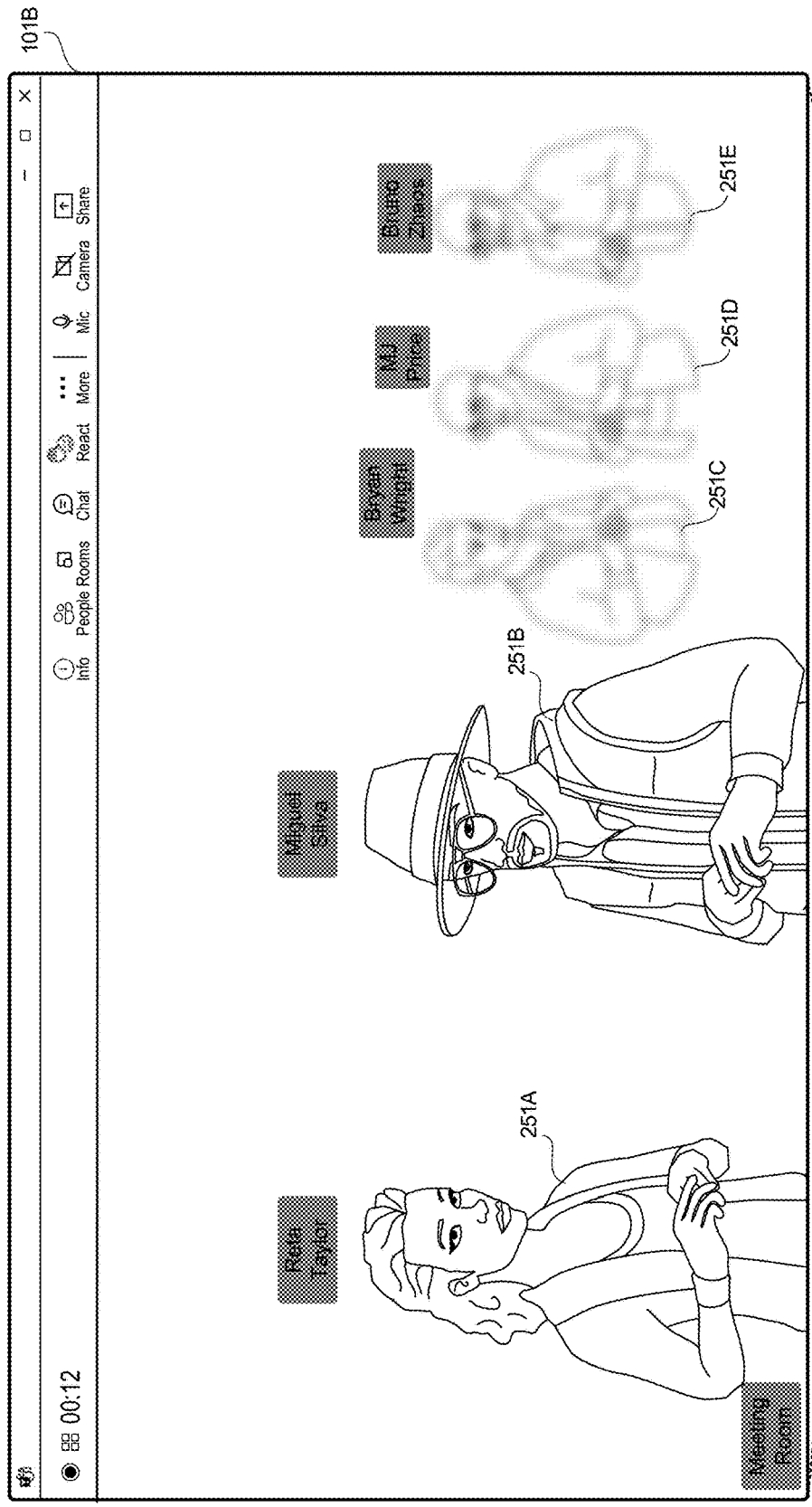
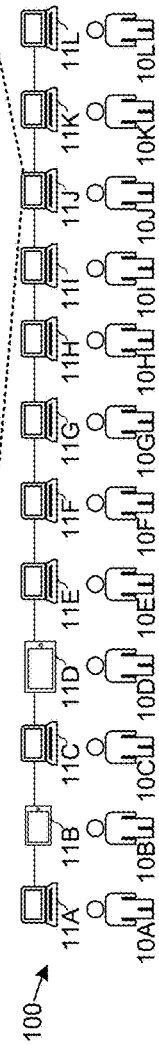
FIGURE 1B

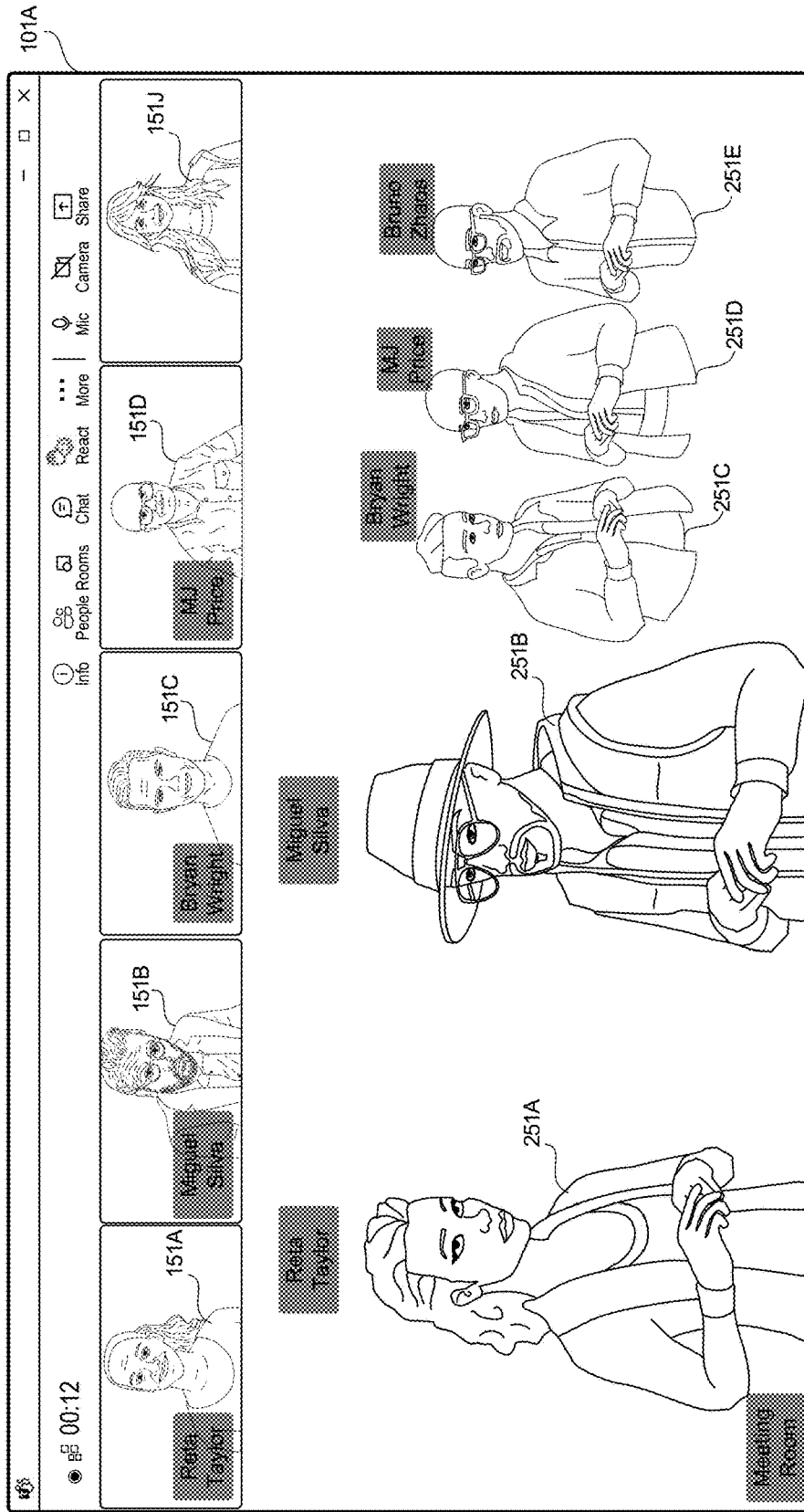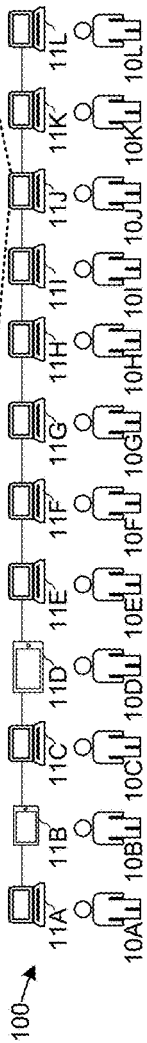
FIGURE 3A

CHANGING VIDEO STREAMS AND BRING FOCUS BY ZOOMING

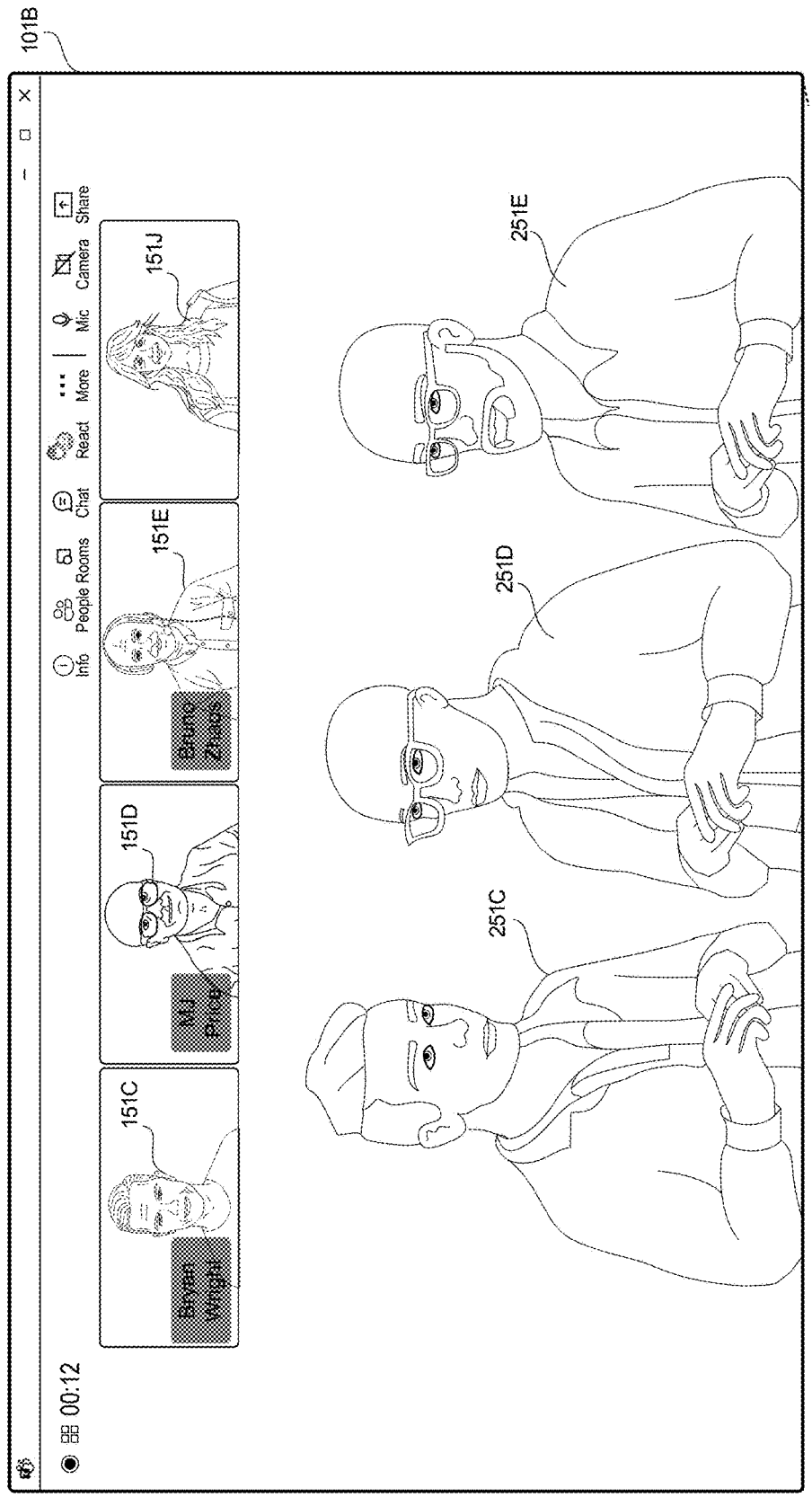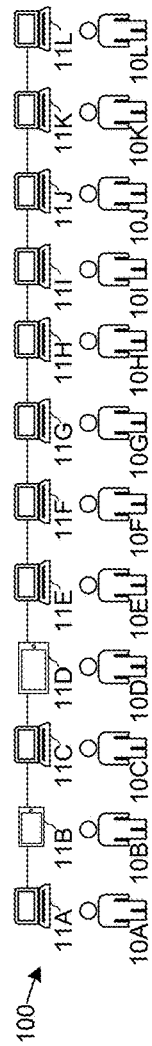
FIGURE 4B

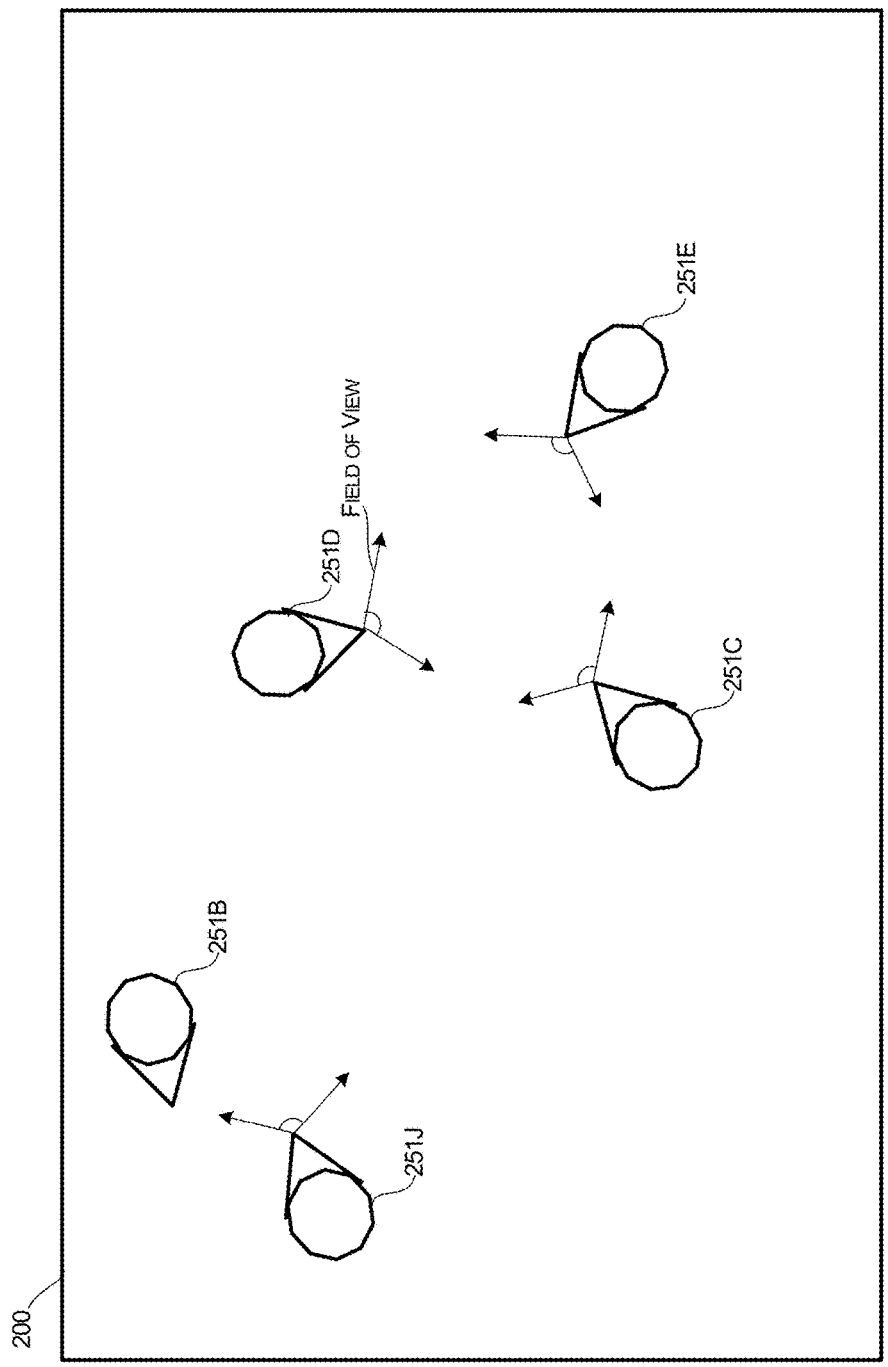

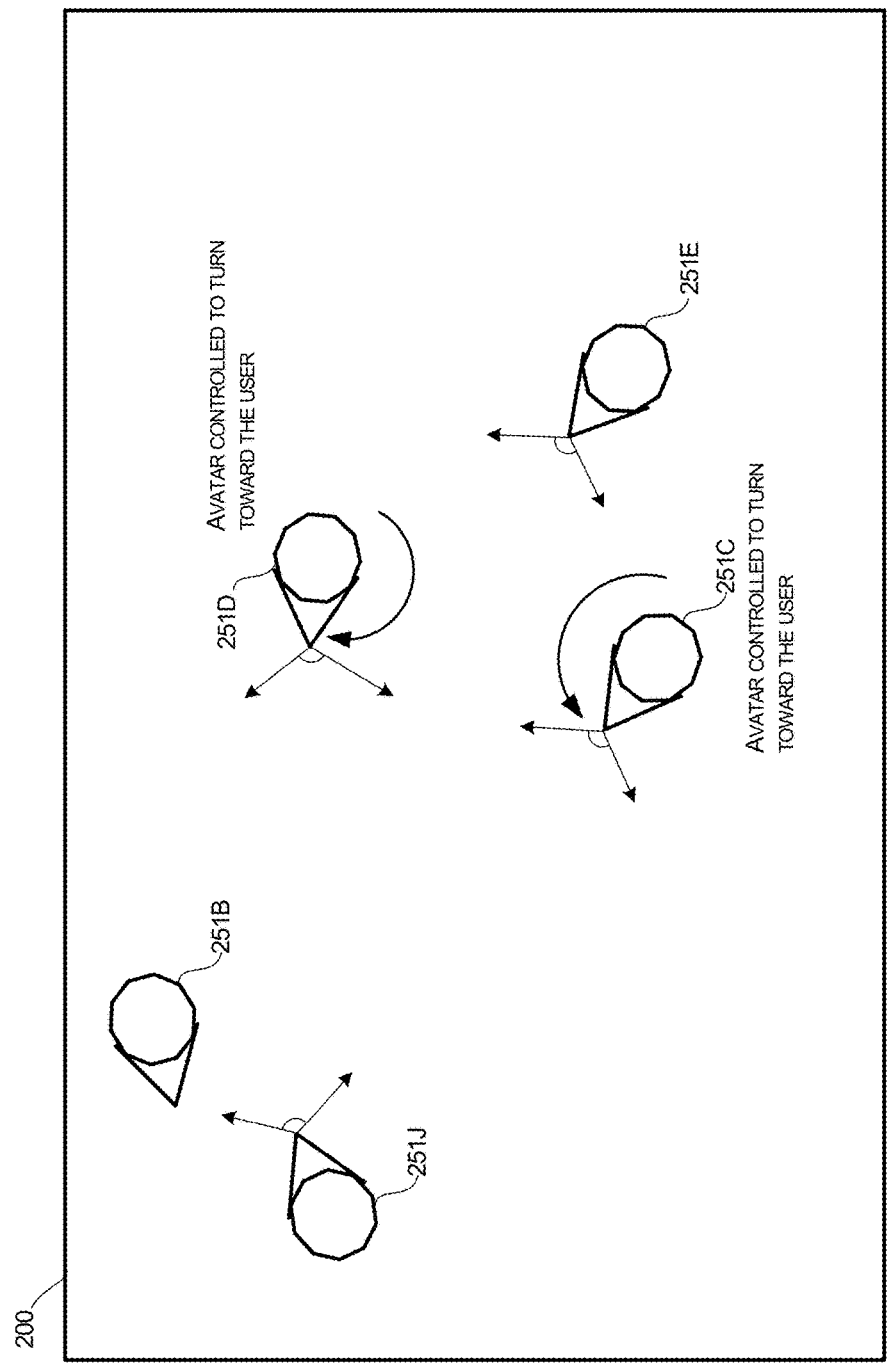

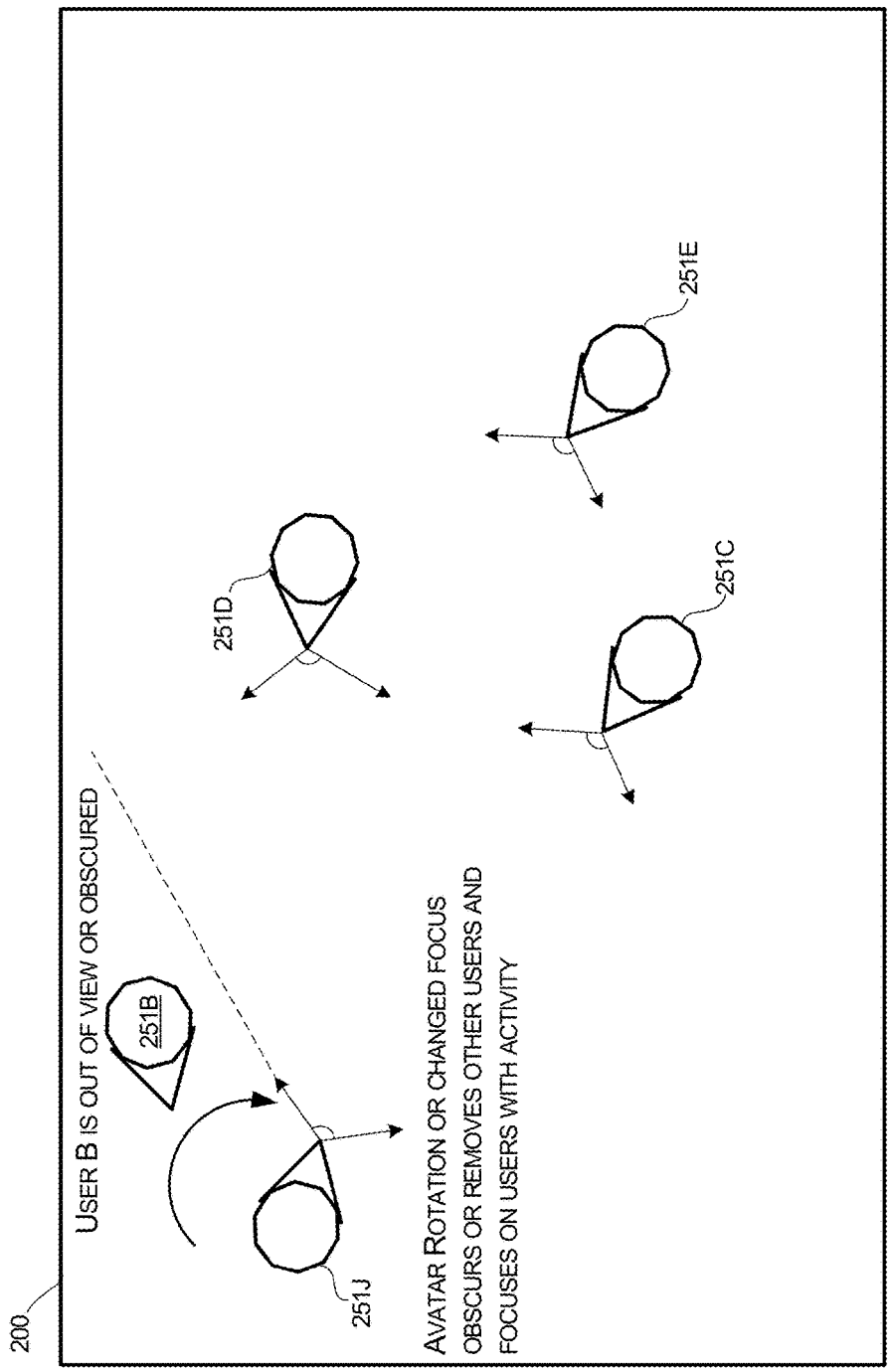

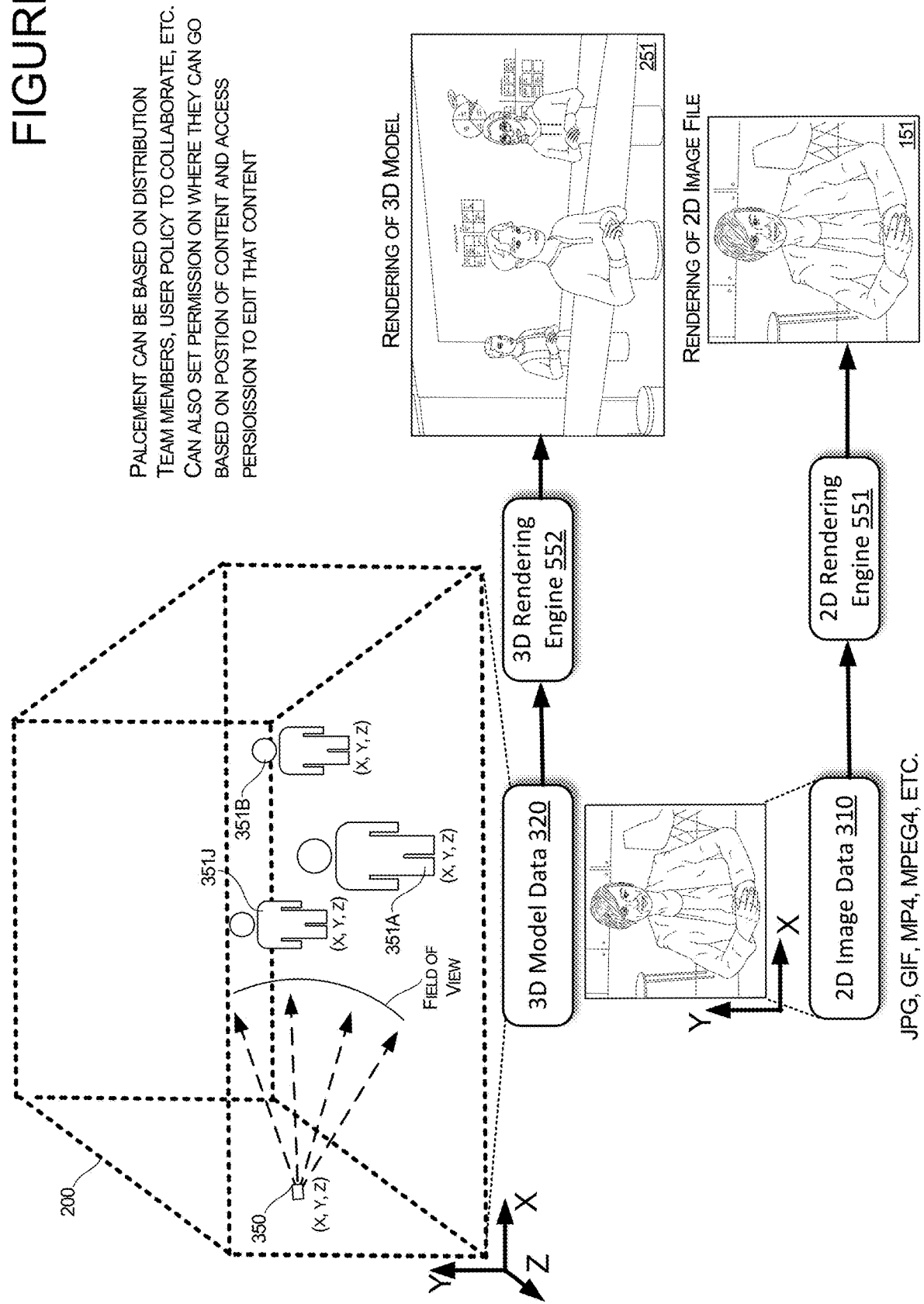

AUTOMATION OF AUDIO AND VIEWING PERSPECTIVES FOR BRINGING FOCUS TO RELEVANT ACTIVITY OF A COMMUNICATION SESSION

BACKGROUND

The use of meta-verse environments for on-line meeting applications is becoming ubiquitous. Participants of online meetings now meet in three-dimensional (3D) virtual environments and share content within those virtual environments. Despite a number of benefits over other forms of collaboration, the use of 3D environments for sharing content can raise a number of drawbacks.

One of the main issues with using meta-verse environments for on-line meeting applications is that there may be scenarios where the participants of a meeting may have trouble identifying relevant user activity. Some systems supporting 3D environments can allow many users to participate. Some environments allow hundreds of users. For certain types of events, such as a meeting, it may be hard for a user to identify specific conversations and specific people engaging in activity that is of interest. This can cause a number of inefficiencies as it may require a user to search for relevant activity. This can be a difficult task given that traditional search methods are not available in live conversations. When it comes to three dimensional environments, the navigation tools are not always optimized for searching for relevant activity and it may be difficult to navigate through large groups of people to find relevant activity.

These shortcomings can lead to ineffective interactions between a computing device and a user, particularly during a communication session. In addition, the above-described shortcomings of existing systems can lead to a loss in user engagement. Computing devices that do not promote user engagement, or worse, contribute to a loss of user engagement and subpar interactions, can lead to production loss and inefficiencies with respect to a number computing resources. For instance, when a user becomes fatigued or disengaged, that user may need to refer to other resources, such as documents or use other forms of communication, when shared content is missed or overlooked. Missed content may need to be re-sent when viewers miss salient points or cues during a live meeting. Such activities can lead to inefficient or duplicative use of a network, processor, memory, or other computing resources. Thus, there is an ongoing need to develop improvements to help make the user experience of communication systems more engaging and more like, or better than, an in-person meeting.

SUMMARY

The techniques disclosed herein enable systems to guide a user's attention to relevant activity of a communication session displayed in a 3D environment. The system can control a viewing perspective to focus on specific avatars that are relevant to a user viewing the activity. The system can also control audio signals from remote users of a communication session to enable the viewer to focus on relevant discussions and other audio content. For example, when a group of remote users control their avatars to perform a gesture identifying the select user, e.g., the group of remote users name a select user in a conversation, or control their avatars to look at the select user's avatar, the system can obscure a view of other avatars to bring focus to avatars of that group of remote users. The system can also increase the volume of audio signals from that group of remote users and zoom in on the avatars of that group of remote users. This focused view enables the select user to readily see and hear relevant activity of particular group of remote users. The system can bring focus to one or more members of a particular group of remote users in response to any type of activity of the remote users that identifies the user, such as file sharing. By directing visual and audio perspectives of a 3D environment, a system can help users navigate through activity of large groups of participants that are using 3D representatives of a 3D environment to collaborate.

In one illustrative example, a system can initially display of a first user interface arrangement on a display device directed to a user, e.g., a viewer. The first user interface arrangement can include individual renderings of 3D representations of remote users participating in the communication session with the user. Each of the 3D representations can be avatars of the remote user each having a controllable position and orientation within a 3D environment. The system can then monitor user activity of the communication session to identify at least one input from a remote user controlling one of the displayed avatars. For instance, the input can indicate that a remote user is controlling their avatar to direct a gesture toward the user. For example, a remote user can direct their avatar to look at or move towards an avatar of the user. Any other activity of a remote user that identifies the user can be used to trigger the user interface and audio transitions described herein. For example, when a group of remote users identifies the user in a conversation or when that group of remote users begins to share content with the user, such activity can cause the system to trigger the user interface and audio transitions described herein. The system can also track the identities of the remote users conducting the triggering activity. For illustrative purposes, the remote users conducting the triggering activity are referred to herein as a subset of users participating in the communication session.

When the system detects an input identifying a particular user and a particular activity that triggers a transition of the user interface or audio signals, the system transitions the first user interface arrangement comprising individual renderings of 3D representations of the users participating in the communication session to a second user interface arrangement that focuses on the subset of one or more of the 3D representations associated with the subset of remote users. The system can focus on the subset of users by obscuring or blurring the representations of other users. The system can also focus on the subset of users by increasing a sharpness level of avatars of the subset of users or zooming a perspective view focusing on avatars associated with the subset of users. The system can also focus on the subset of users by increasing the volume of audio signals received from computing devices of the subset of users. The system can also focus on the subset of users by decreasing the volume of other remote users other than the subset of users. The system can control the audio of the remote users in any manner that allows the user to hear a differentiation between the users who are part of the subset of the users versus other users who are not part of the subset of users of the communication session.

The techniques disclosure in provide a number of technical benefits. For instance, by promoting user engagement and helping users find relevant activity and relevant information, particularly in a communication system, users can more effectively exchange information. This helps mitigate occurrences where shared content is missed or overlooked. This can reduce occurrences where users need to re-send information. More effective communication of shared content can also help avoid the need for external systems, such as mobile phones for texting and other messaging platforms. This can help reduce the duplicative use of network, processor, memory, or other computing resources especially when prolonged meetings or additional meetings can be avoided.

Features and technical benefits other than those explicitly described above will be apparent from a reading of the following Detailed Description and a review of the associated drawings. This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter. The term "techniques," for instance, may refer to system(s), method(s), computer-readable instructions, module(s), algorithms, hardware logic, and/or operation(s) as permitted by the context described above and throughout the document.

BRIEF DESCRIPTION OF THE DRAWINGS

The Detailed Description is described with reference to the accompanying figures. In the figures, the left-most digit(s) of a reference number identifies the figure in which the reference number first appears. The same reference numbers in different figures indicate similar or identical items. References made to individual items of a plurality of items can use a reference number with a letter of a sequence of letters to refer to each individual item. Generic references to the items may use the specific reference number without the sequence of letters.

FIG. 1B illustrates a second user interface arrangement that focuses on a subset of the plurality of users using a blurring feature.

FIG. 3A illustrates a first user interface arrangement showing a plurality of users.

FIG. 4B illustrates a second user interface arrangement that focuses on a subset of the plurality of users by adding 2D video renderings and using a perspective modification feature.

FIG. 5A illustrates a scenario where avatars for users are directed away from a select user.

FIG. 5B illustrates a scenario where avatars for users are directed away from a select user and then move toward the select user.

FIG. 5C illustrates a scenario where a system controls the viewing perspective of a select user in response to avatars of other users directing a field of view toward an avatar of the select user.

FIG. 6 illustrates additional technical details on the UI renderings disclosed herein.

DETAILED DESCRIPTION

Figure 1A:
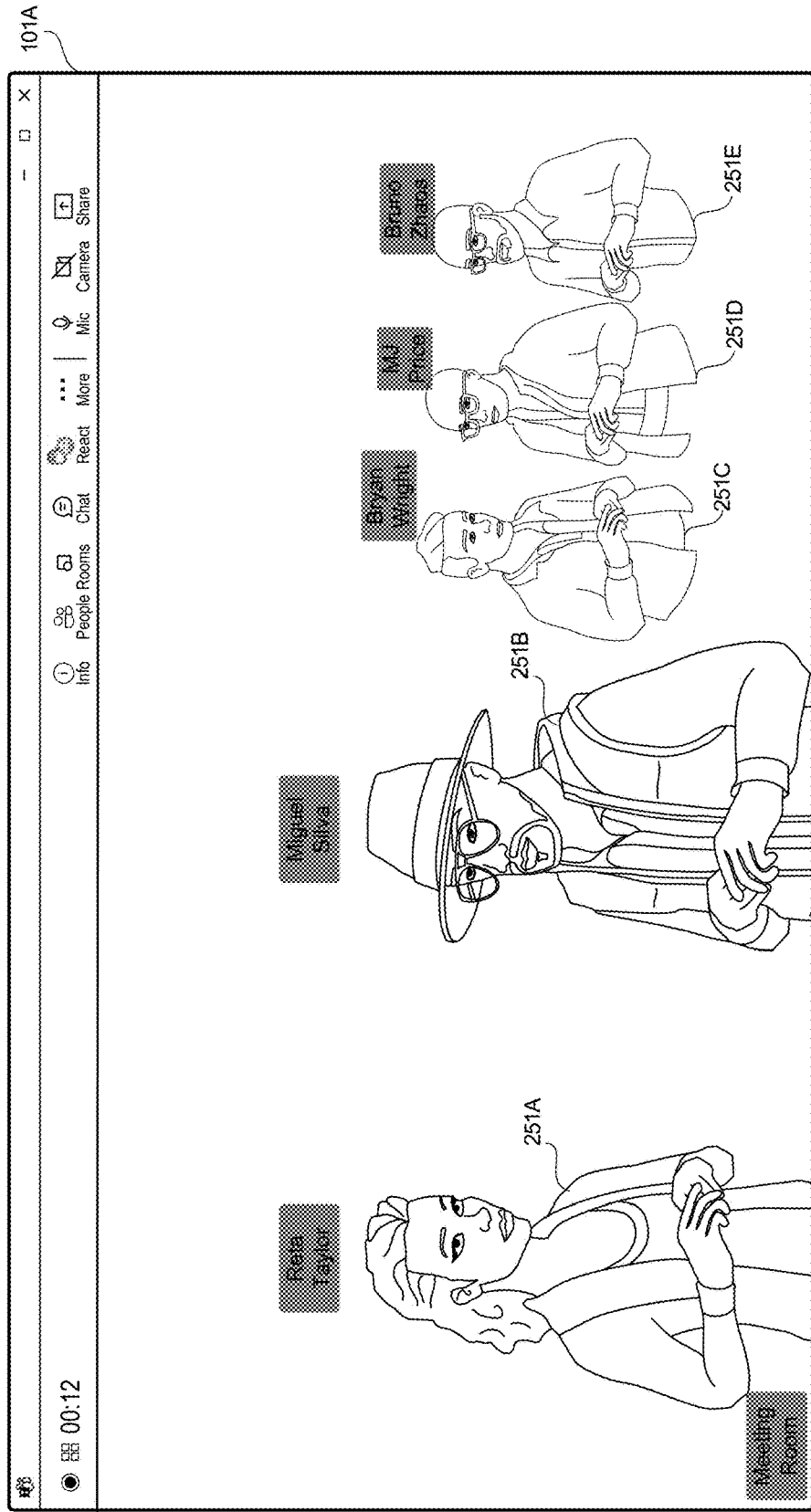
FIG. 1A illustrates a first user interface arrangement showing a plurality of users.

FIGS. 1A and 1B illustrate an example of a UI transition that changes a viewing perspective of a 3D environment to bring focus to relevant activity for a user participating in a communication session. The communication session can be managed by a system 100 comprising a number of computers 11 each corresponding to a number of users 10. In this example, the First User 10A, Reta Taylor, is associated with the first computer 11A, the Second User 10B, Miguel Silva, is associated with the second computer 11B, the Third User 10C, Bryan Wright, is associated with the third computer 11C, the Fourth User 10D, MJ Price, is associated with the fourth computer 11D, the Fifth User 10E, Bruno Zhaos, is associated with the fifth computer 11E, the Sixth User 10F, Serena Davis, is associated with the sixth computer 11F, the Seventh User 10G, Krystal McKinney, is associated with the seventh computer 11G, the Eighth User 10H, Jessica Kline, is associated with the eighth computer 11H, the Ninth User 10I, Kat Larsson, is associated with the ninth computer 11I, and the tenth User 10J, Traci Isaac, is associated with the tenth computer 11J. These users can also be respectively referred to as "User A," User B," etc. Other users, e.g., User K and User L, are also participants of the communication session. Each user can be displayed in a user interface as a two-dimensional image or each user can be displayed in a user interface as a three-dimensional representation 251. The 3D representation may be a static model or a dynamic model that is animated in real-time responsive to a user input. Although this example illustrates a user interface with users displayed as 3D representations, it can be appreciated that the techniques disclosed herein can apply to other forms of images such as a 2D image of each user.

The computers can be in the form of desktop computers, head-mounted display units, tablets, mobile phones, etc. The system can generate a user interface showing aspects of the communication session to each of the users. In this example, a first user interface arrangement 101A can include a number of renderings of each user 10. The renderings can include renderings of two-dimensional (2D) images, which can include a picture or live video feed of a user. The first user interface 101A can also include renderings of the three-dimensional 3D representations 251, which can include avatars positioned within a 3D virtual environment 200. In this particular example, the user interface 101 includes a 3D rendering of a representative 251A of the first user 10A, a 3D rendering of a representative 251B of the second user 10B, a 3D rendering of a representative 251C of the third user 10C, a 3D rendering of a representative 251D of the fourth user 10D, and a 3D rendering of a representative 251E of the fifth user 10E. The first user interface arrangement 101A can also include 2D renderings of these users and other users. In this example, the first user interface arrangement 101A is displayed on a display device in communication with the tenth computing device 11J of the tenth user 10J.

In this example, the system executes a transition from the UI of FIG. 1A to the UI of FIG. 1B. The system causes a display of a first user interface arrangement 101A on a display device 629 associated with the user 10J. The first user interface arrangement 101A comprises individual renderings of three-dimensional representations 251A-251E of a plurality of users 10A-10E participating in the communication session with the user 10J. The first user interface arrangement 101A can also include 2D renderings of image files or live streams of the plurality of users or other users. The individual three-dimensional representations 251A-251E have an independent position and an independent orientation within the three-dimensional environment 200 that are each controlled by input data 650 provided by associated users of the plurality of users 10A-10E. An example of the first user interface arrangement 101A is shown in FIG. 1A. In this example, the first user interface arrangement 101A has renderings of 3D avatars 251 in a 3D virtual environment, and the viewing users is User J, also referred to herein as the select user 10J.

The system monitors user activity of the communication session to identify at least one remote user that provides an input or that identifies the user 10J. For example, the system can monitor input activity to identify when a threshold number of remote users 10A-10E state the name of User J. In another example, the system can monitor input activity to identify when a threshold number of remote users 10A-10E control their avatar to look at the avatar of User J. In yet another example, the system can monitor input activity to identify when a threshold number of remote users 10A-10E share data, e.g., files or meeting content, with User J.

In some embodiments, one or more computers can monitor input data 650 from the plurality of users 10A-10E participating in the communication session 604 with the user 10J. The system is configured to take one or more actions when the system detects: input data 650 that identifies or refers to User J in a gesture of an avatar, input data 650 that identifies User J in one or more operations for sharing content, and/or input data 650 that identifies User J in one or more forms of communication where User J is identified in verbal conversations, text messages, content, etc. For example, when a remote user specifically names User J in a Word document using an at-mention, the system can trigger one or more actions for controlling a visual or audio perspective of User J to draw attention to the activity of the remote user.

The system can determine a subset of users from the plurality of users. In one example, if the first user 10A controls their avatar to look at User J or if the first user 10A names User J in any document or communication, the system identifies the first user 10A as part of the subset of users. The input data 650 that identifies the user 10J is received from one or more computing devices 11A-11B associated with one or more users, such as User A and User B, the system determines that these users are part of a subset of users. In another illustrative example, if the first user 10A controls their avatar to look at User J, the first user is identified as part of the subset of the users. In yet another example, the subset of users can also be associated with a user that provides input data. For instance, if the first user 10A controls their avatar to look at User J, and the first user 10A has an avatar that is within a threshold distance of other avatars of other users, such as the second user, the other users, e.g., the second user 10B, can also be identified as part of the subset of users. In another example, if first user 10A controls their avatar to look at User J or shares content with User J, and the first user 10A has an avatar that is within a threshold distance of other avatars of other users or the other users are in a conversation with the first user 10A, the system may identify the other users as part of the subset of users. Once the subset of users is identified, the system causes the transition of the user interface.

The system can transition the first user interface arrangement 101A, shown in FIG. 1A, to a second user interface arrangement 101B, shown in FIG. 1B, in response to the input data 650 that identifies the user 10J. The transition can include a first display of the first user interface arrangement 101A comprising individual renderings of three-dimensional representations 251A-251E of a plurality of users 10A-10E participating in the communication session 604 to the second user interface arrangement 101B that focuses on the subset of the one or more of the three-dimensional representations 251A-251B associated with the subset of users 10A-10B. The focus on the three-dimensional representations 251A-251B of the subset of users 10A-10B generates a visual focus on the 3D representations 251A-251B of the subset of users. In this example, the focus can include the modification of display properties to give the appearance that a lens is focusing on 3D representations 251A-251B of the subset of users. This can include an increased level of sharpness with respect to the lines of the representations 251A-251B or a filter that removes any aberrations or graphical elements that distort the representations 251A-251B. This focus on the representations 251A-251B also includes rendering the other representations 251C-251E of other users of the plurality of users 10C-10E such that they appear out of focus or blurry or obscured.

The system can also focus on the audio signals generated by computers 11A-11B associated with the subset of users. The audio focus can include a control that differentiates the audio generated by computers of the subset of users from audio generated by computers of other users 10C-10E. For instance, the system may increase a volume associated with each user's 10A-10B microphone and turn the microphones of other user's 10C-10E down. At the same time, or alternatively, the system may also increase a focus level on three-dimensional representations 251A-251B associated with the subset of users 10A-10B and decrease the focus, or block, of a display of representations 251C-251E of other users of the plurality of users 10C-10E. The focus of the transition can also include zooming in on three-dimensional representations 251A-251B associated with the subset of users 10A-10B.

In addition to the transition the first user interface arrangement 101A, shown in FIG. 1A, to a second user interface arrangement 101B, shown in FIG. 1B, or alternatively, the system can also adjust the volume to distinguish audio signals from computing devices 11A-11B of the subset of users in response to the input. For instance, in response to the input from computing devices 11A-11B, where the input identifies the select user 10J, the system can increase the volume of audio streams of the users associated with the computing devices 11A-11B. In response to the input, the system can reduce the volume of the audio streams generated by computing devices of other users of the plurality of users 10C-10E.

Figure 1C:
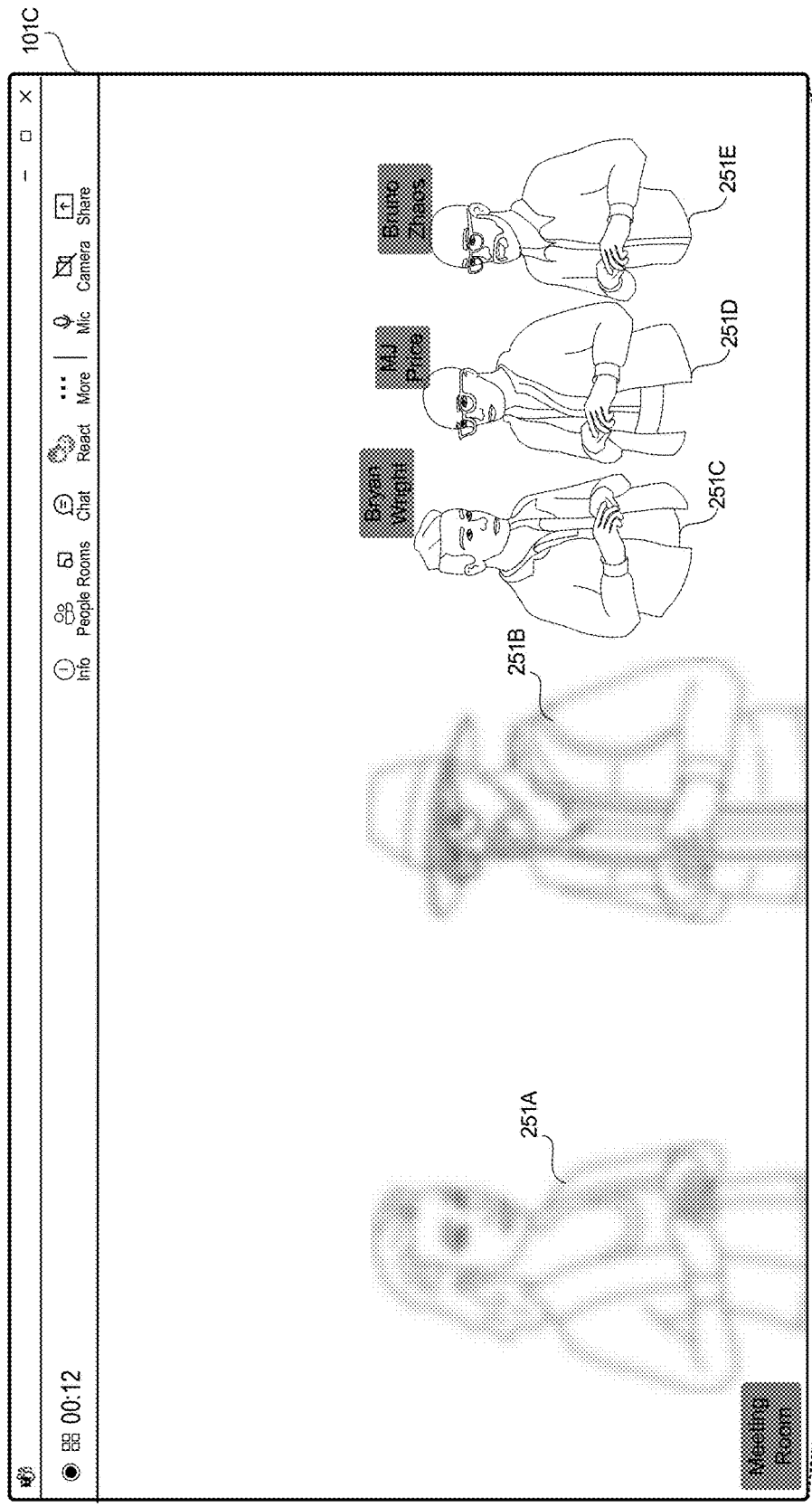
FIG. 1C illustrates another user interface arrangement that focuses on another subset of the plurality of users using a blurring feature.

FIGS. 1B and 1C illustrate another example of a transition that can occur when another subset of users 10C-10E provide one or more inputs that identify the select user 10J. In response to such an input that identifies the user 10J, the system can transition the second user interface arrangement 101B shown in FIG. 1B, to a third user interface arrangement 101C shown in FIG. 1C. This transition can start with a display of the second user interface arrangement 101B comprising individual renderings of three-dimensional representations 251A-251B of a first subset of users 10A-10B and transition to a third user interface arrangement 101C that focuses on the second subset of users 10C-10E who are displayed as representations 251C-251E. As shown in FIG. 1C, after this second transition, the focus on the first subset of the one or more of the three-dimensional representations 251A-251B is diminished, e.g., the three-dimensional representations 251A-251B of the first subset of users are no longer in a focused view, e.g., they are blurred, darkened, obscured, or otherwise removed. Also, in the second transition to the third user interface arrangement 101C, the focus is then transferred to the 3D representations 251C-251E of the second subset of users 10C-10E. Alternatively or concurrently, the volume of the audio signals generated by computing devices of the second subset of users 10C-10E can also be increased and the audio signals of the first subset of users 10A-10B is decreased.

Figure 2A:
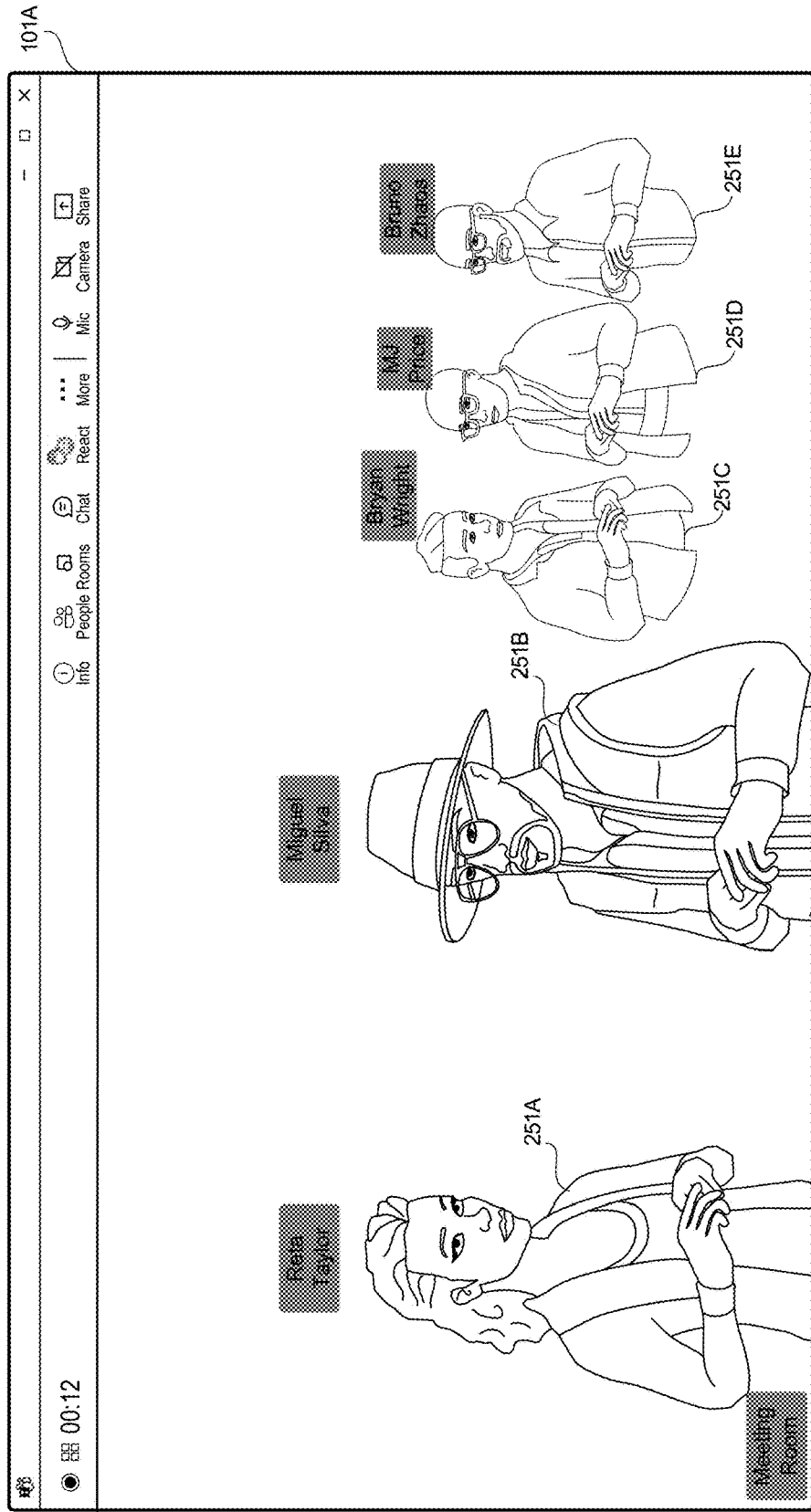
FIG. 2A illustrates a first user interface arrangement showing a plurality of users.
Figure 2B:
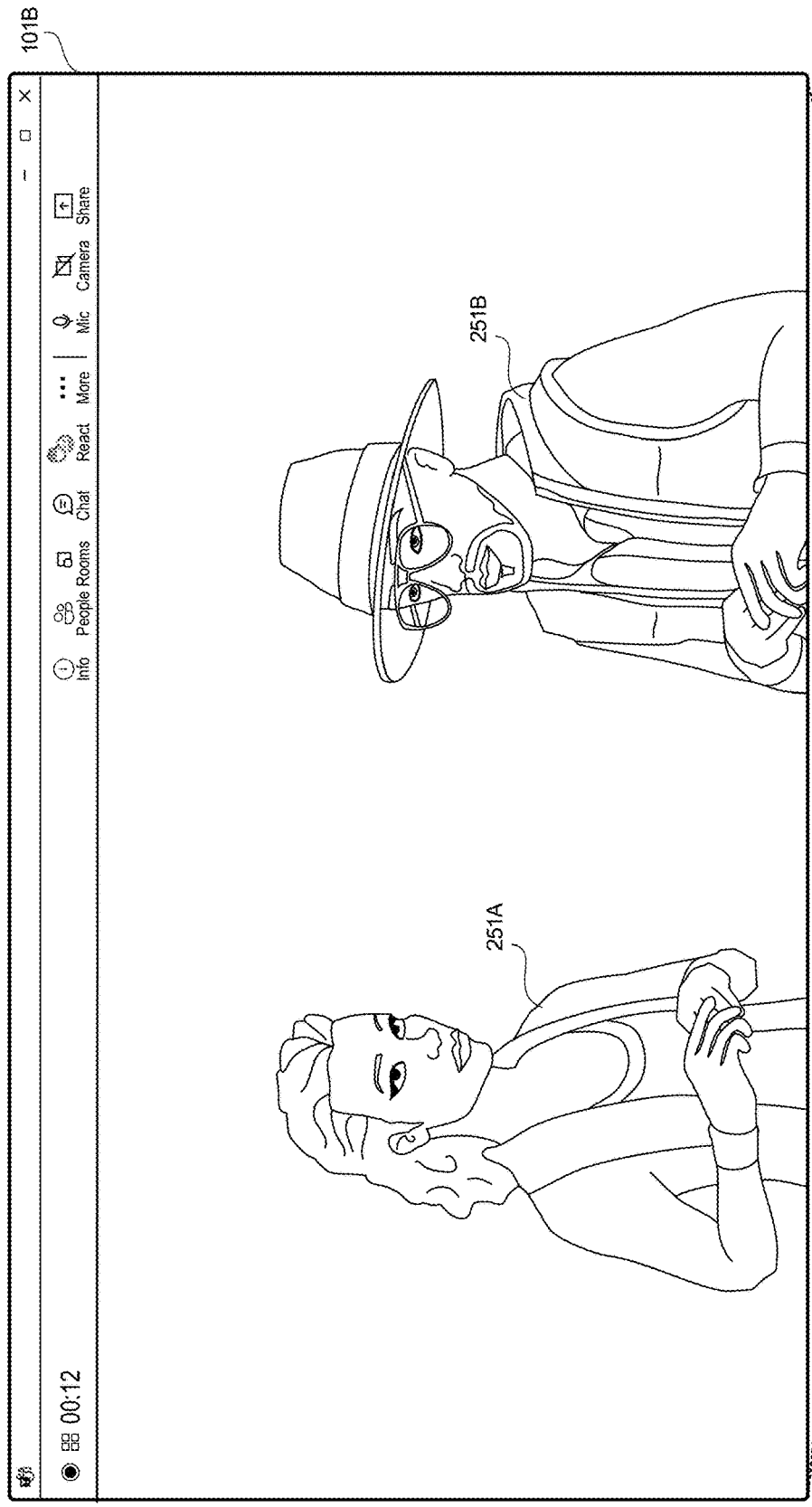
FIG. 2B illustrates a second user interface arrangement that focuses on a subset of the plurality of users using a perspective modification feature on 3D renderings.
Figure 2C:
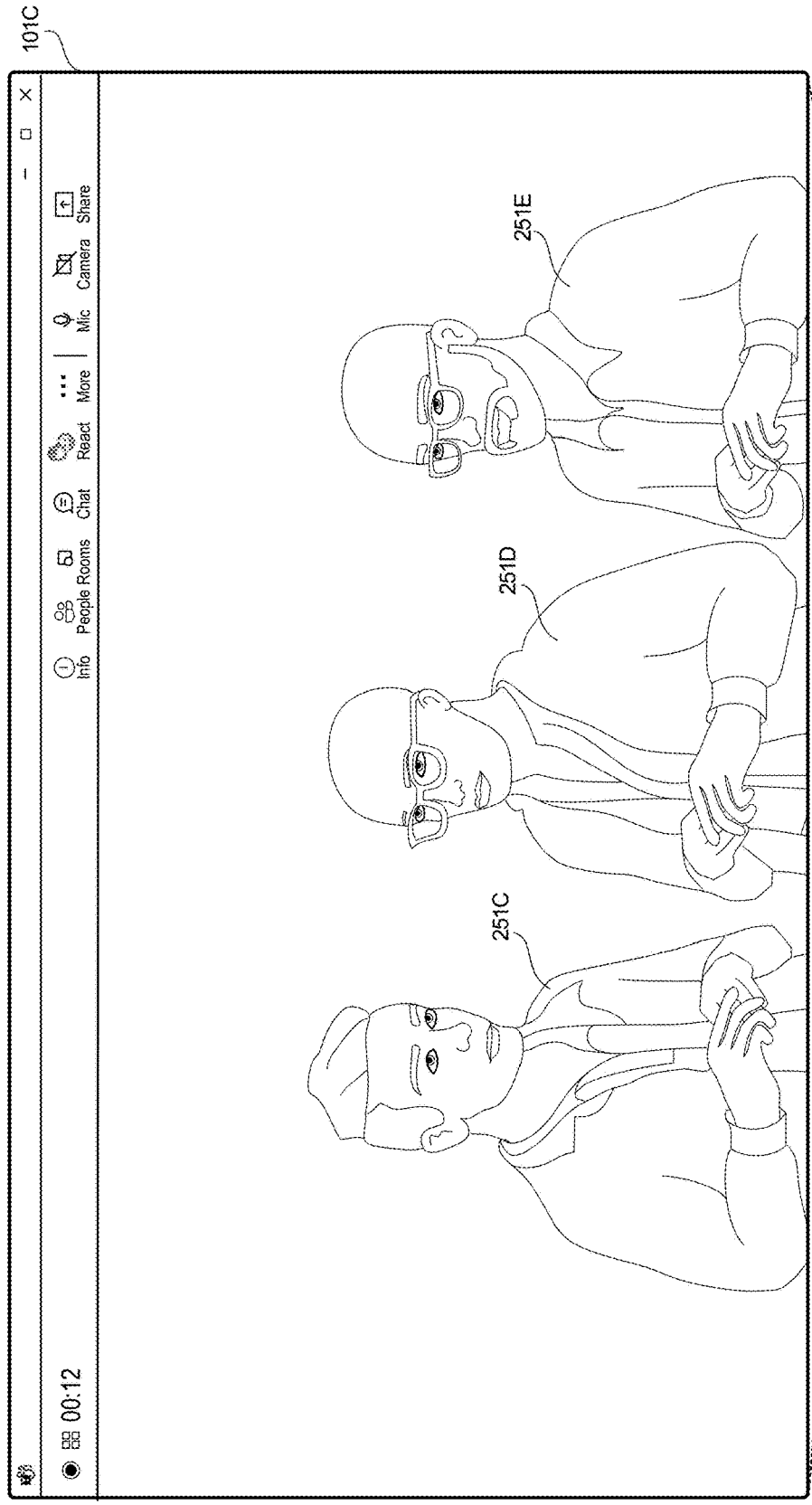
FIG. 2C illustrates another user interface arrangement that focuses on another subset of the plurality of users using a perspective modification feature on 3D renderings.

FIGS. 2A-2C illustrates another example of a user interface transition that may occur when a triggering input is received. In this example, the user interface transition includes an adjustment of a viewing perspective, e.g., a zoom level, that allows a user, such as User J, to readily see relevant content and activity. The first user interface arrangement 101A starts with the renderings similar to those described above with respect to FIG. 1A.

The system can transition the first user interface arrangement 101A, shown in FIG. 2A, to a second user interface arrangement 101B, shown in FIG. 2B, in response to the input data 650 that identifies the user 10J. The transition can include a first display of the first user interface arrangement 101A comprising individual renderings of three-dimensional representations 251A-251E of a plurality of users 10A-10E participating in the communication session 604 to the second user interface arrangement 101B that focuses on the subset of the one or more of the 3D representations 251A-251B associated with the subset of users 10A-10B. The focus on the subset of the one or more of the three-dimensional representations 251A-251B generates a visual focus on the three-dimensional representations 251A-251B of the subset of users. in this example, the visual focus includes changing a perspective view, e.g., such that a camera has focused in on the 3D representations 251A-251B of the subset of users 10A-10B. This focus on the subset of users also includes removing or otherwise obscuring representations 251C-251E of other users of the plurality of users 10C-10E.

The system can also focus on the audio signals generated by computers 11A-11B associated with the subset of users. The audio focus can include a control that differentiates the audio generated by computers of the subset of users from audio generated by computers of other users 10C-10E. For instance, the system may increase a volume associated with each user's 10A-10B microphone and turn the microphones of other user's 10C-10E down. At the same time, or alternatively, the system may also increase a focus level on three-dimensional representations 251A-251B associated with the subset of users 10A-10B and decrease the focus, or block, of a display of representations 251C-251E of other users of the plurality of users 10C-10E.

In addition to the transition the first user interface arrangement 101A, shown in FIG. 2A, to a second user interface arrangement 101B, shown in FIG. 2B, or alternatively, the system can adjust the volume to distinguish audio signals from computing devices 11A-11B of the subset of users in response to the input. For instance, in response to the input from computing devices 11A-11B, where the input identifies the select user 10J, the system can increase the volume of audio streams of the users associated with the computing devices 11A-11B. In response to the input, the system can reduce the volume of the audio streams generated by computing devices of other users of the plurality of users 10C-10E.

FIGS. 2B and 2C illustrate another example of a transition that can occur when another subset of users 10C-10E provide one or more inputs that identify the select user 10J. In response to such an input that identifies the user 10J, the system can transition the second user interface arrangement 101B shown in FIG. 2B, to a third user interface arrangement 101C shown in FIG. 2C. This transition can start with a display of the second user interface arrangement 101B comprising individual renderings of three-dimensional representations 251A-251B of a first subset of users 10A-10B and transition to a third user interface arrangement 101C that focuses on the second subset of users 10C-10E who are displayed as representations 251C-251E. As shown in FIG. 2C, after this second transition, the focus on the first subset of the one or more of the three-dimensional representations 251A-251B is removed, e.g., the three-dimensional representations 251A-251B of the first subset of users are no longer in the view. Also, in the second transition to the third user interface arrangement 101C, the focus is then transferred to the 3D representations 251C-251E of the second subset of users 10C-10E. This can include changing a viewing perspective to give the appearance that a virtual camera is directed towards the avatars of the second subset of users. Alternatively or concurrently, the volume of the audio signals generated by computing devices of the second subset of users 10C-10E can also be increased and the audio signals of the first subset of users 10A-10B is decreased.

Figure 3B:
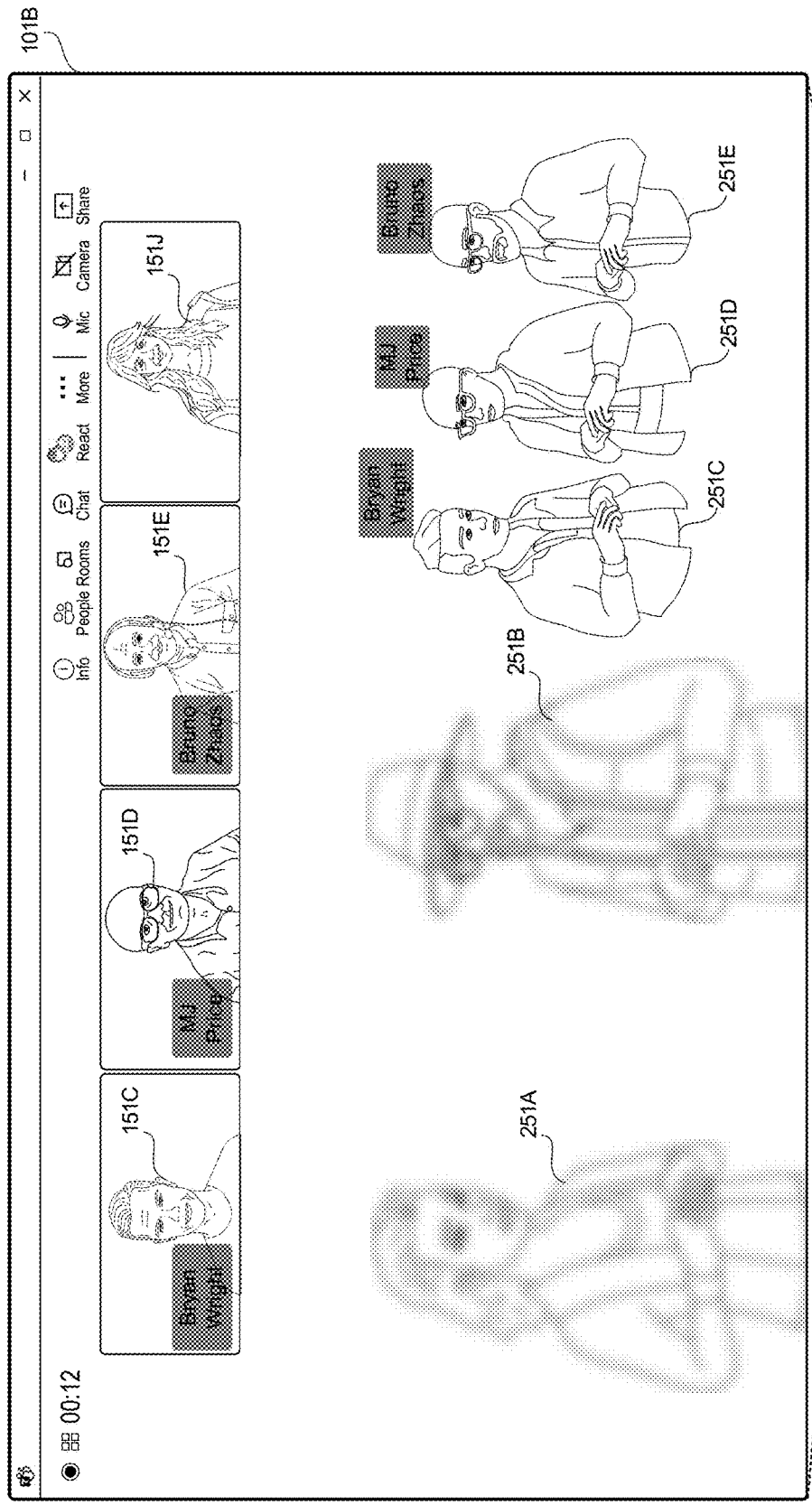
FIG. 3B illustrates a second user interface arrangement that focuses on a subset of the plurality of users adding 2D video renderings and using a blurring feature on 3D renderings.

FIGS. 3A-3B illustrates another example of a user interface transition that may occur when a triggering input is received. In this example, the user interface transition includes an adjustment of a focus level of select renderings that allows a user, such as User J, to readily view relevant content and activity. The first user interface arrangement 101A starts with the 3D renderings similar to those described above with respect to FIG. 1A. The first user interface arrangement 101A also includes a 2D rendering of at least a subset of the users that are displayed as renderings 251. For example, the user interface can include a video rendering 151A of the first user 10A, a video rendering 151B of the second user 10B, a video rendering 151C of the third user 10C, a video rendering 151D of the fourth user 10D, and a rendering of the viewing user, User J. In general, the 2D renderings 151 of the subset of users can track the participants that are displayed as representations. As described below, as the system brings focus to select 3D representations 251 or other images of participants, the system can display 2D renderings of video streams of those select users. In this example, the first user interface arrangement 101A is displayed on a display device in communication with the tenth computing device 11J of the tenth user 10J.

In response to the input that identifies the select user, the system causes the transition from the first user interface arrangement shown in FIG. 3A to the second user interface arrangement shown in FIG. 3B. In the transition to the second user interface arrangement shown in FIG. 3B, the system controls the 3D representations in a manner described above with respect to FIG. 1C. Specifically, the system brings focus to a select subset of users, in this case users 10C-10E, by bringing focus on the associated renderings 251C-251E. In addition to the transition that focuses on the 3D representations, the system also modifies the 2D renderings of the video streams produced by each respective user. In this example, the second user interface arrangement shown in FIG. 3B includes a 2D rendering of at least some of the subset of users. For instance, since Bryan, MJ and Bruno are controlling avatars or engaging in activity that meets a criteria or a preset condition, the system can bring focus to their 3D representations, and in addition, the system can remove other 2D images shown in FIG. 3A, and display 2D images, which may be an image of real time video data, of Bryan, MJ and Bruno. In some embodiments, the second user interface arrangement 101B can also include a "me" view, which includes a 2D rendering of the user, User J, viewing the user interface.

Figure 4A:
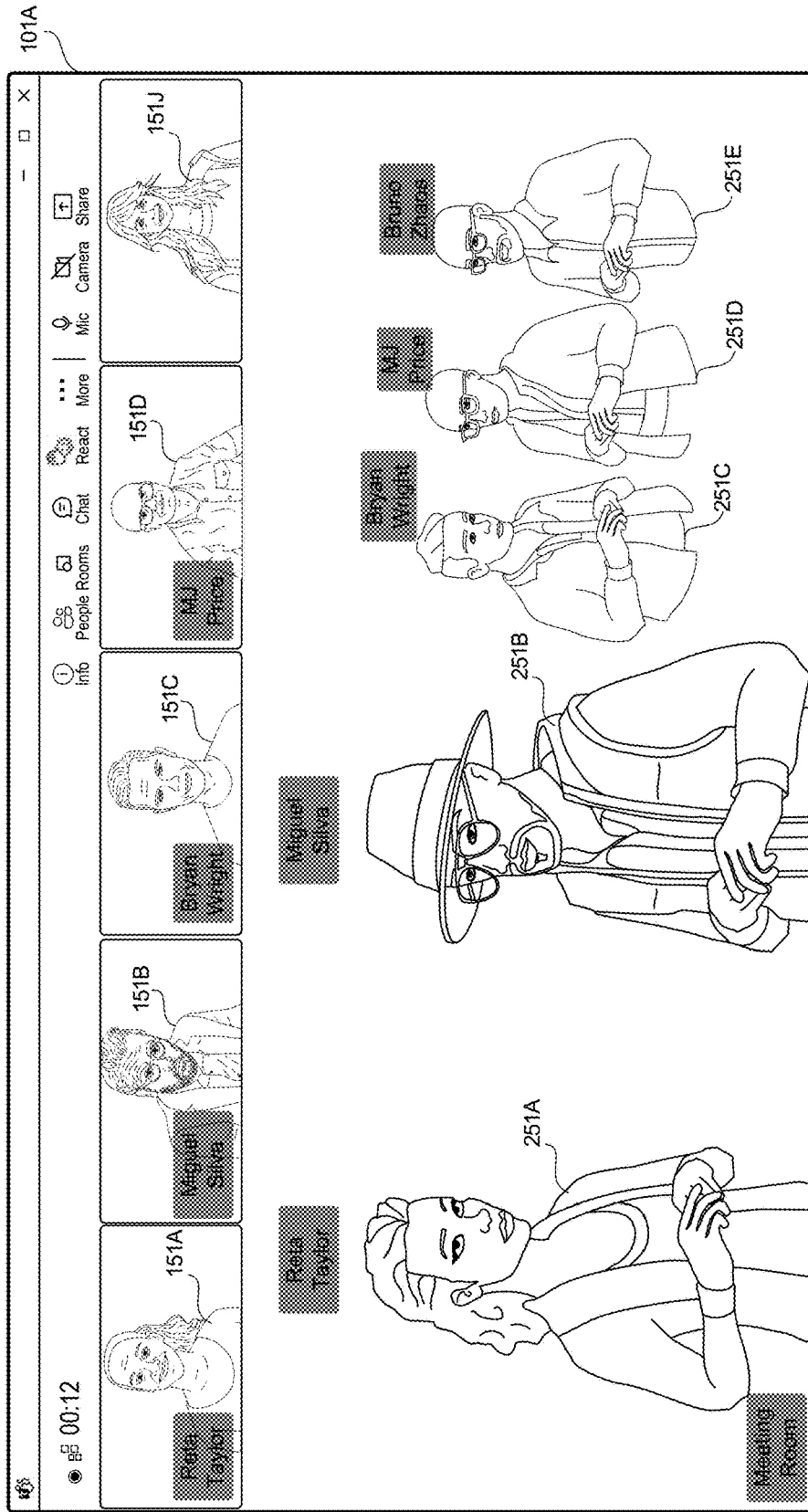
FIG. 4A illustrates a first user interface arrangement showing a plurality of users.

FIGS. 4A-4B illustrates another example of a user interface transition that may occur when a triggering input is received. In this example, the user interface transition includes an adjustment of a viewing perspective, e.g., a zoom level, that allows a user, such as User J, to readily see relevant content and activity. The first user interface arrangement 101A of FIG. 4A starts with the 3D renderings similar to those described above with respect to FIG. 1A. The first user interface arrangement 101A of FIG. 4A also includes 2D renderings of at least a subset of the users that are displayed as renderings 251. For example, the user interface can include a video rendering 151A of the first user 10A, a video rendering 151B of the second user 10B, a video rendering 151C of the third user 10C, a video rendering 151D of the fourth user 10D, and a rendering of the viewing user, User J. In general, the 2D renderings 151 of the subset of users can track the participants that are displayed as representations. As described below, as the system brings focus to select 3D representations 251 or other images of participants, the system can display 2D renderings of video streams of those select users. In this example, the first user interface arrangement 101A is displayed on a display device in communication with the tenth computing device 11J of the tenth user 10J.

In response to the input that identifies the select user, User J, the system causes the transition from the first user interface arrangement shown in FIG. 4A to the second user interface arrangement shown in FIG. 4B. In the transition to the second user interface arrangement shown in FIG. 4B, the system controls the 3D representations in a manner described above with respect to FIG. 2C. Specifically, the system brings focus to a select subset of users, in this case users 10C-10E, by zooming in on the associated renderings 251C-251E and removing the renderings of other users. In addition to the transition that focuses on the 3D representations, the system also modifies the 2D renderings of the video streams produced by each respective user. In this example, the second user interface arrangement shown in FIG. 4B includes 2D renderings of at least some of the subset of users. For instance, since Bryan, MJ and Bruno are controlling avatars or engaging in activity that meets a criteria or a preset condition, the system can bring focus to their 3D representations, and in addition, the system can remove other 2D images shown in FIG. 4A, and display 2D images, which may be an image of real time video data, of Bryan, MJ and Bruno.

FIGS. 5A-5C illustrates a scenario where a system controls the viewing perspective of a select user in response to avatars of other users directing a field of view toward an avatar of the select user. These figures illustrate a top view of a 3D environment 200. FIG. 5A illustrates a first state of the 3D environment where avatars for User C, User D, and User E are all looking at one another, where their field of view is not directed toward the select user, User J. User B is also in a first state having a viewing area that is directed toward the select user.

As shown in FIG. 5B, a second state of the 3D environment shows that User C and User D have rotated to direct their field of view towards the select user. When the system detects this type of gesture, e.g., a gesture where a user provides an input that moves an avatar or changes an orientation of an avatar, that is directed to a select user, the system can interpret that type of input as a triggering input that causes any of the user interface transitions described herein. In some embodiments, when a group of users are within a threshold distance of one another, the system may only cause a transition of a user interface when a threshold number of avatars of that group perform a gesture that identifies or is directed toward this select user. In this example, if the threshold number of users is 2 users, and two out of the three users of a group perform a gesture that identifies the select user, the system can cause one of the user interface transitions described herein. FIG. 5C shows an example of an avatar for the select user after the user interface transition. In this case, the avatar for the select user, User J, may also rotate or otherwise focus on users, User C and User D (and User E), associated with the triggering input. This also communicates a gesture to User C, User D and User E that the system has automatically provided the transition for the select user. This signal allows the other users to notice that the select user is engaged with their activity.

FIG. 6 illustrates additional technical details on the UI renderings disclosed herein. In some embodiments, when an input is received for causing the UI transitions described herein, the system can determine a location and orientation for the 3D representation of select user. For instance, in the example shown in FIG. 5C, when the select user has to rotate to show their level of engagement with users that provided the input, e.g., User C and User D, the system may have to move or rotate the avatar of the select user. This means that a virtual objects 351J may have to have a position and orientation that allows the corresponding avatar to view the other virtual objects.

FIG. 6 also shows aspects of a system configured to implement the techniques disclosed herein. For illustrative purposes, a rendering of a 2D image file or a rendering of a 2D image of a user can be generated by a 2D rendering engine 551 receiving 2D image data 310, e.g., an image file. A rendering of a 2D image file can include a 2D environment, e.g., the background of an image, and a 2D object, e.g., an image of a person or an avatar. The image file, e.g., image data 310, can have pixels arranged in two dimensions, e.g., pixels arranged within a two-dimensional coordinate system (x, y). This data can also be referred to herein as a two-dimensional model that is based on a two-dimensional coordinate system. Each part of an image can be a pixel or any other geometric shape, such as a triangle. For instance, a group of pixels or triangles can be used to generate a rendering of a two-dimensional avatar of a user, or a live video image of a person.

A two-dimensional environment having a number of 2D images of participants of a communication session is also referred to herein as a "grid environment." Image data or a communication data stream can define a two-dimensional environment or a two-dimensional object, and that two-dimensional environment can be rendered on a display screen. The rendering can be referred to herein as a two-dimensional rendering of a two-dimensional environment or a two-dimensional rendering of a two-dimensional object. This is also referred to herein as a "rendering of the two-dimensional image."

For illustrative purposes, a rendering of a 3D model or a rendering of a 3D representation of the user can be generated by a 3D rendering engine 552 accessing 3D model data 320, e.g., a 3D model. A 3D model can include parameters defining a 3D environment 200, e.g., a model of a room, and parameters defining 3D objects, e.g., size, shape, and position data for representations 351 of users or other virtual objects. A three-dimensional environment is a computing environment model that is based on a three-dimensional coordinate system. Attributes of the three-dimensional environment and three-dimensional objects in the three-dimensional environment are based on components that are positioned within a three-dimensional coordinate system (x, y, z). Each component can be a triangle or any other geometric shape. Each of the components can have a position, e.g., a location in the three-dimensional coordinate system, as well as an orientation, e.g., a direction in which a triangle is pointed. For instance, a group of triangles can be used to generate a rendering of a three-dimensional avatar of a user or a three-dimensional rendering of a three-dimensional object.

A three-dimensional environment is also referred to herein as an "immersive environment." Model data or a three-dimensional model can be included in a communication data stream and the model data can define a three-dimensional environment. That three-dimensional environment can be based on a three-dimensional coordinate system. When the rendering engine 552 generates a 3D rendering from a 3D model, that rendering is generated from a reference point in the environment, e.g., a perspective having a position relative to the virtual environment. for illustrative purposes, a reference point is also referred to herein as a virtual camera 350. That camera can have a field of view which is used to generate a rendering of a 3D environment or a 3D object based on the position of the virtual camera 350. The rendering of a three-dimensional object in the three-dimensional environment is based on a position and orientation of the three-dimensional object and the position of the virtual camera 350.

In some embodiments, two-dimensional images can be displayed within a three-dimensional environment. This can occur, for instance, when a communication system receives a two-dimensional video stream of a user, but participants receiving that video stream are viewing a 3D environment with HMDs. This may cause the system to show the image of that user on as if they are appearing on a virtual television on the wall of the virtual environment. This is referred to herein as a two-dimensional rendering of a user within a three-dimensional environment. This can include the third user 10C shown in FIG. 2A as a rendering 151C.

In some embodiments, a three-dimensional environment and three-dimensional objects defined by a three-dimensional model can be displayed as a two-dimensional rendering. This can occur, for instance, when a communication session involves a user interface that shows two-dimensional images, e.g., when Teams is in Grid Mode. While in this mode, the system may need to display images of users interacting in a 3D environment. In this instance, a 2D image of the 3D environment is displayed from a particular position, e.g., a virtual camera position, and that 2D image is displayed within one of the grids. This rendering can be referred to herein as a two-dimensional rendering of a three-dimensional environment. To achieve a two-dimensional rendering of a three-dimensional environment, model data defining a three-dimensional environment can be projected using a transform. The transform can generate the rendering such that the width, height, and depth of a three-dimensional object can be expressed on a flat screen using vector projections from a model of the object to a point of view, e.g., a virtual camera position.

Figure 7:
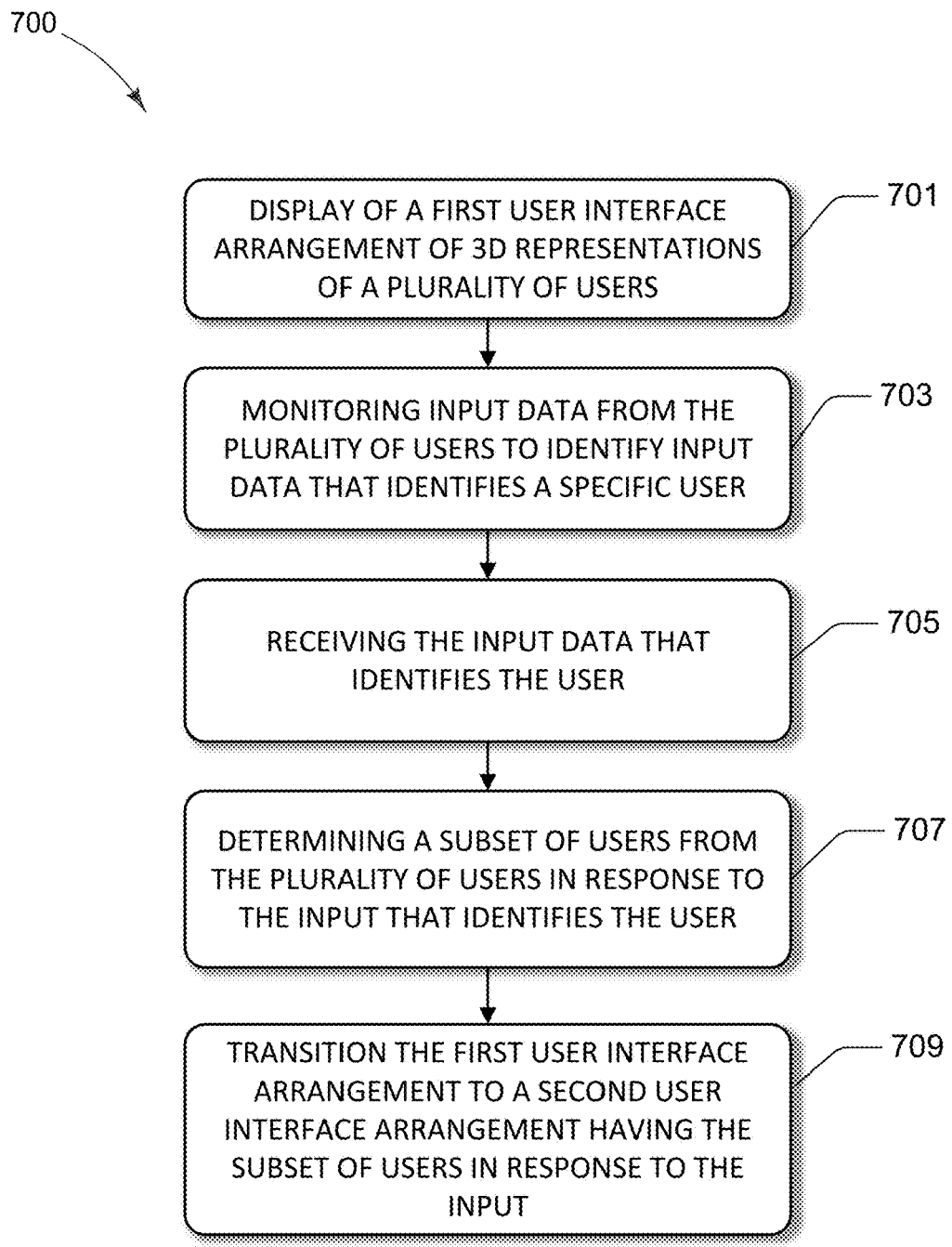
FIG. 7 is a flow diagram showing aspects of a routine for controlling a viewing perspective of a three-dimensional environment to bring focus to relevant activity for a user participating in a communication session.

FIG. 7 is a diagram illustrating aspects of a routine 700 for controlling viewing and audio perspectives for bringing focus to relevant activity of a communication session. It should be understood by those of ordinary skill in the art that the operations of the methods disclosed herein are not necessarily presented in any particular order and that performance of some or all of the operations in an alternative order is possible and is contemplated. The operations have been presented in the demonstrated order for ease of description and illustration. Operations may be added, omitted, performed together, and/or performed simultaneously, without departing from the scope of the appended claims.

It should also be understood that the illustrated methods can start or end at any time and need not be performed in their entirety. Some or all operations of the methods, and/or substantially equivalent operations, can be performed by execution of computer-readable instructions included on a computer-storage media, as defined herein. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like. Although the example routine described below is operating on a system, e.g., one or more computing devices, it can be appreciated that this routine can be performed on any computing system which may include any number of computers working in concert to perform the operations disclosed herein.

Thus, it should be appreciated that the logical operations described herein are implemented as a sequence of computer implemented acts or program modules running on a computing system such as those described herein and/or as interconnected machine logic circuits or circuit modules within the computing system. The implementation is a matter of choice dependent on the performance and other requirements of the computing system. Accordingly, the logical operations may be implemented in software, in firmware, in special purpose digital logic, and any combination thereof.

Additionally, the operations illustrated in FIG. 7 and the other FIGURES can be implemented in association with the example user interfaces and systems described herein. For instance, the various devices and/or modules described herein can generate, transmit, receive, and/or display data associated with content of a communication session e.g., live content, broadcasted event, recorded content, etc. and/or a presentation UI that includes renderings of one or more participants of remote computing devices, avatars, channels, chat sessions, video streams, images, virtual objects, and/or applications associated with a communication session.

The routine 700 includes an operation 701 where the system causes a display of a first user interface arrangement 101A on a display device 629 associated with the user 10J. The first user interface arrangement 101A comprises individual renderings of three-dimensional representations 251A-251E of a plurality of users 10A-10E participating in the communication session with the user 10J. The first user interface arrangement 101A can also include 2D renderings of image files or live streams of the plurality of users or other users. The individual three-dimensional representations 251A-251E have an independent position and an independent orientation within the three-dimensional environment 200 that are each controlled by input data 650 provided by associated users of the plurality of users 10A-10E. An example of the first user interface arrangement 101A is shown in FIG. 1A. In this example, the first user interface arrangement 101A has renderings of 3D avatars in a 3D virtual environment, and the viewing users is User J, the tenth user 10J.

At operation 703, the system can monitor user activity of the communication session to identify at least one remote user 10A-10E that provides an input or that identifies the user 10J. For example, a threshold number of remote users 10A-10E can state the name of User J. In another example, a threshold number of remote users 10A-10E can control their avatar to look at the avatar of User J. In yet another example, a threshold number of remote users 10A-10E can share data, e.g., files or meeting content, with User J. In some embodiments, one or more computers can monitor input data 650 from the plurality of users 10A-10E participating in the communication session 604 with the user 10J. The system is configured to take one or more actions when the system detects: input data 650 that identifies or refers to User J in a gesture of an avatar, input data 650 that identifies User J in one or more operations for sharing content, and/or input data 650 that identifies User J in one or more forms of communication where User J is identified by any name in conversation, text messages, content, etc. For example, when a remote user names User J in a Word document using an at-mention, the system can trigger one or more actions for controlling a visual or audio perspective.

At operation 705, the system can receive at least one user input from remote users that identifies User J. This can include an input that directs directing a gesture toward the user's avatar, e.g., one of the avatars looks in the direction of the user, a remote user mentions the user's name, a remote user shares a file. In the example of FIG. 1A, the system can receive the input data 650 that identifies the user 10J.

In operation 705, the system can also receive a query from a user, User J. The query can include the names of any other individual in the virtual environment. By submitting a query about other users, the system can automatically bring highlight or bring focus to those users. For instance, if User J provides a voice input that asks about Rita and Miguel, the system will bring focus to those users as shown in FIG. 1B. In addition, an input may also be provided by a computer. A computer can scan profiles of each user in a 3D environment and if two or more profiles have a matching score that meets a threshold, The system can focus on 3D renderings related to those matching profiles. This can include people that are on the same team, family members, managers, users having a particular management level that are relevant to an employee, etc. In another example, if User J has a set of hobbies and other users, such as Rita and Miguel, have matching hobbies, the system can transition to the user interface shown in FIG. 1B from the UI shown in FIG. 1A.

At operation, 707, the system determines a subset of users from the plurality of users. In one example, if the first user 10A controls their avatar to look at User J or if the first user 10A names User J in any document or communication, the system identifies the first user 10A as part of the subset of users. In another example, if input data 650 that identifies the user 10J is received from multiple computing devices 11A-11B associated with multiple users, such as User A and User B, the system determines that these users are part of a subset of users. In another illustrative example, if the first user 10A controls their avatar to look at User J, the first user is identified as part of the subset of the users.

The subset of users can also be associated with a user that provides input data. For instance, if the first user 10A controls their avatar to look at User J, and the first user 10A has an avatar that is within a threshold distance of other avatars of other users, such as the second user, the other users, e.g., the second user 10B, can also be identified as part of the subset of users. In another example, if first user 10A controls their avatar to look at User J or shares content with User J, and the first user 10A has an avatar that is within a threshold distance of other avatars of other users or the other users are in a conversation with the first user 10A, the system may identify the other users as part of the subset of users.

At operation 709, the system can transition the first user interface arrangement 101A to a second user interface arrangement 101B in response to the input data 650 that identifies the user 10J. The transition can include a first display of the first user interface arrangement 101A comprising individual renderings of three-dimensional representations 251A-251E of a plurality of users 10A-10E participating in the communication session 604 to the second user interface arrangement 101B that focuses on the subset of the one or more of the three-dimensional representations 251A-251B associated with the subset of users 10A-10B. The focus on the subset of the one or more of the three-dimensional representations 251A-251B generates a visual or audio control differentiation between the subset of the one or more of the three-dimensional representations 251A-251B from other three-dimensional representations 251C-251E of other users of the plurality of users 10C-10E. For instance, the system may increase a volume associated with each user's 10A-10B microphone and turn the microphones of other user's 10C-10E down. At the same time, or alternatively, the system may also increase a focus level on three-dimensional representations 251A-251B associated with the subset of users 10A-10B and decrease or block a display of representations 251C-251E of other users of the plurality of users 10C-10E. The focus of the transition can also include zooming in on three-dimensional representations 251A-251B associated with the subset of users 10A-10B. An example of such features are shown in FIGS. 1B, 1C, 2B, 2C, 3B, and 4B.

In some configurations, the operations described above can include a method for controlling a viewing perspective of an environment (200) to selectively bring focus to relevant activity for a user (10J) participating in a communication session (604), the method configured for execution on a system. For example, the system can display 3D avatars in a 3D virtual environment or 2D images of users. The method can include further operations for causing a display of a first user interface arrangement (101A) on a display device (629)

associated with the user (10J), wherein the first user interface arrangement (101A) comprises individual renderings of representations (151F-151J, 251A-251E) of a plurality of users (10A-10E) participating in the communication session with the user (10J), wherein each of the representations (151F-151J, 251A-251E) have an independent position and an independent orientation within the three-dimensional environment (200) that are each controlled by input data provided by associated users of the plurality of users (10A-10E). This UI can include both a 3D avatars and/or 2D images of users. The system can then monitor user activity of the communication session to identify at least one input from a remote user controlling one of the displayed avatars, looks for input that identifies the user. Examples: (1) remote user states the user's name, (2) a remote user controls their avatar to look at the user, (3) a remote user shares data with the user. The operations can include monitoring input data (650) from the plurality of users (10A-10E) participating in the communication session (604) with the user (10J). This monitoring can identify any activity related to the user. For instance, the operations can look for any preset condition that may include an audio signal identifying the user, any preset condition of users discussing certain topics specified in the preset condition, e.g., users talking about jazz or baseball, people profile meeting specific conditions that user is interested in meeting/interacting (members from a specific team, from a company, roles, industries, etc.), eye gazing direction towards a field associated with the user, etc. When the system detects that any input data, such as audio data or video data or any device or sensor data indicates the presence of any of the preset conditions, e.g., activity that is relevant to the user, the system can initiate any of the operations for bringing focus to a person or a group of people. Data defining a preset condition can include topics that are of interest to a particular user, e.g., User J, profiles of people, etc. When an input identifies any of the topics of people of interest to the user, the system can bring focus on an image of any user generating the input.

As shown in FIG. 5B, the system can receive at least one user input from remote users directing a gesture toward the user's avatar or naming the user, e.g., one of the avatars looks in the direction of the user, a remote user mentions the user's name, a remote user shares a file. This operation can include determining that the input data (650) includes content meeting a preset condition associated with the user (10J), wherein the content meeting the preset condition associated with the user (10J) is received from one or more computing devices (11A-11B) associated with a subset of users (10A-10B).

As shown in FIG. 1B, a new UI focuses on the subset of avatars providing the input. This can include a UI that focuses on the avatars, e.g., zooming in on the relevant avatars and/or blurring other avatars. This can include operations where a system, in response to determining that the content of the input data (650) meets the preset condition associated with the user (10J), transitions the first user interface arrangement (101A) comprising individual renderings of representations (251A-251E) of the plurality of users (10A-10E) participating in the communication session (604) to a second user interface arrangement (101B) on the display device (629) associated with the user (10J), wherein the second user interface arrangement (101B) focuses on the subset of the one or more of the representations (251A-251B) associated with the subset of users (10A-10B), by generating a visual or audio control differentiation between the subset of the one or more of the representations (251A-251B) from other representations (251C-251E) of other users of the plurality of users (10C-10E).

Figure 8:
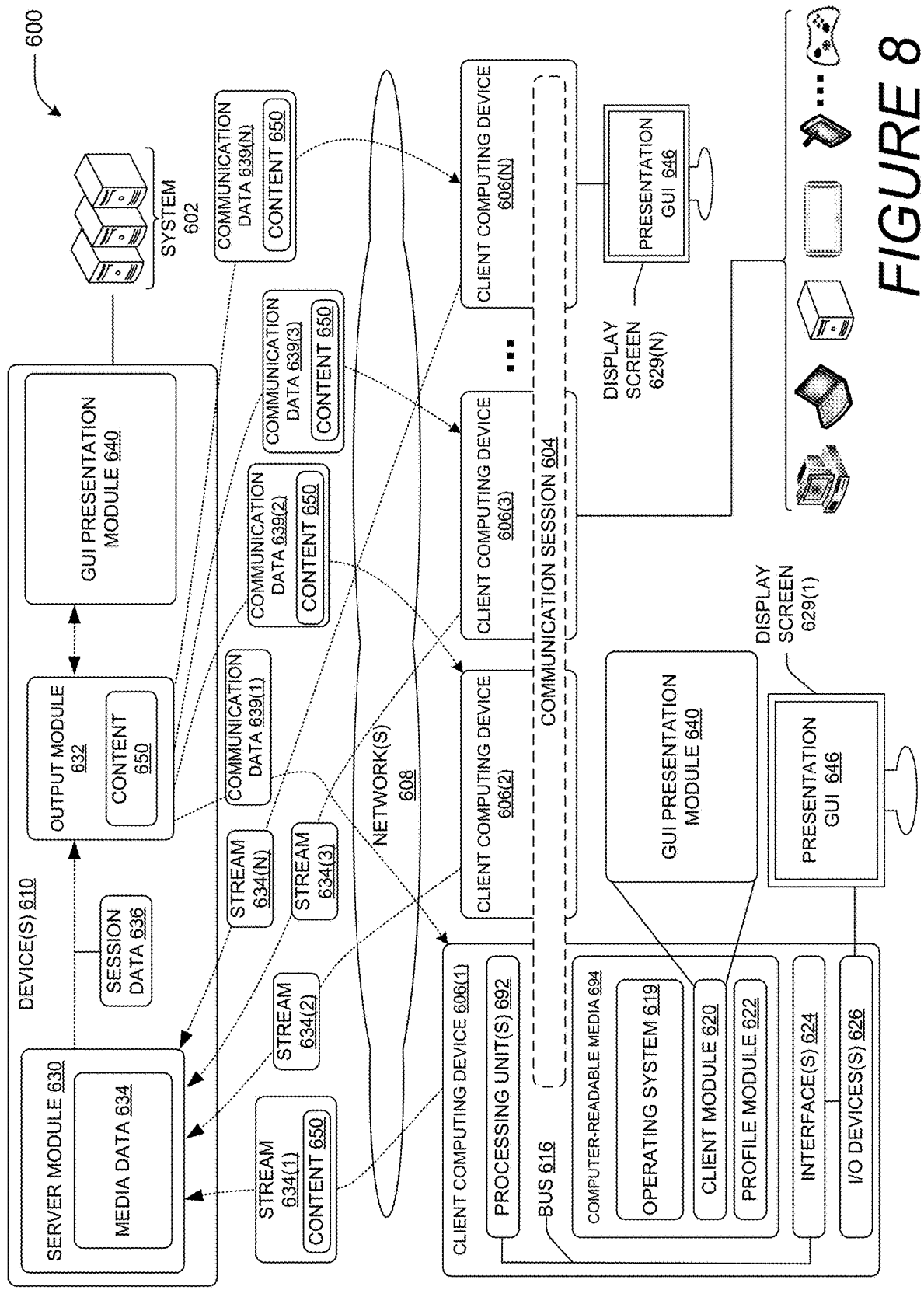
FIG. 8 is a computer architecture diagram illustrating an illustrative computer hardware and software architecture for a computing system capable of implementing aspects of the techniques and technologies presented herein.

FIG. 8 is a diagram illustrating an example environment 600 in which a system 602 can implement the techniques disclosed herein. It should be appreciated that the above-described subject matter may be implemented as a computer-controlled apparatus, a computer process, a computing system, or as an article of manufacture such as a computer-readable storage medium. The operations of the example methods are illustrated in individual blocks and summarized with reference to those blocks. The methods are illustrated as logical flows of blocks, each block of which can represent one or more operations that can be implemented in hardware, software, or a combination thereof. In the context of software, the operations represent computer-executable instructions stored on one or more computer-readable media that, when executed by one or more processors, enable the one or more processors to perform the recited operations.

Generally, computer-executable instructions include routines, programs, objects, modules, components, data structures, and the like that perform particular functions or implement particular abstract data types. The order in which the operations are described is not intended to be construed as a limitation, and any number of the described operations can be executed in any order, combined in any order, subdivided into multiple sub-operations, and/or executed in parallel to implement the described processes. The described processes can be performed by resources associated with one or more device(s) such as one or more internal or external CPUs or GPUs, and/or one or more pieces of hardware logic such as field-programmable gate arrays ("FPGAs"), digital signal processors ("DSPs"), or other types of accelerators.

All of the methods and processes described above may be embodied in, and fully automated via, software code modules executed by one or more general purpose computers or processors. The code modules may be stored in any type of computer-readable storage medium or other computer storage device, such as those described below. Some or all of the methods may alternatively be embodied in specialized computer hardware, such as that described below.

Any routine descriptions, elements or blocks in the flow diagrams described herein and/or depicted in the attached figures should be understood as potentially representing modules, segments, or portions of code that include one or more executable instructions for implementing specific logical functions or elements in the routine. Alternate implementations are included within the scope of the examples described herein in which elements or functions may be deleted, or executed out of order from that shown or discussed, including substantially synchronously or in reverse order, depending on the functionality involved as would be understood by those skilled in the art.

In some implementations, a system 602 may function to collect, analyze, and share data that is displayed to users of a communication session 604. As illustrated, the communication session 603 may be implemented between a number of client computing devices 606(1) through 606(N) (where N is a number having a value of two or greater) that are associated with or are part of the system 602. The client computing devices 606(1) through 606(N) enable users, also referred to as individuals, to participate in the communication session 603.

In this example, the communication session 603 is hosted, over one or more network(s) 608, by the system 602. That is, the system 602 can provide a service that enables users of the client computing devices 606(1) through 606(N) to participate in the communication session 603 (e.g., via a live viewing and/or a recorded viewing). Consequently, a "participant" to the communication session 603 can comprise a user and/or a client computing device (e.g., multiple users may be in a room participating in a communication session via the use of a single client computing device), each of which can communicate with other participants. As an alternative, the communication session 603 can be hosted by one of the client computing devices 606(1) through 606(N) utilizing peer-to-peer technologies. The system 602 can also host chat conversations and other team collaboration functionality (e.g., as part of an application suite).

In some implementations, such chat conversations and other team collaboration functionality are considered external communication sessions distinct from the communication session 603. A computing system 602 that collects participant data in the communication session 603 may be able to link to such external communication sessions. Therefore, the system may receive information, such as date, time, session particulars, and the like, that enables connectivity to such external communication sessions. In one example, a chat conversation can be conducted in accordance with the communication session 603. Additionally, the system 602 may host the communication session 603, which includes at least a plurality of participants co-located at a meeting location, such as a meeting room or auditorium, or located in disparate locations.

In examples described herein, client computing devices 606(1) through 606(N) participating in the communication session 603 are configured to receive and render for display, on a user interface of a display screen, communication data. The communication data can comprise a collection of various instances, or streams, of live content and/or recorded content. The collection of various instances, or streams, of live content and/or recorded content may be provided by one or more cameras, such as video cameras. For example, an individual stream of live or recorded content can comprise media data associated with a video feed provided by a video camera (e.g., audio and visual data that capture the appearance and speech of a user participating in the communication session). In some implementations, the video feeds may comprise such audio and visual data, one or more still images, and/or one or more avatars. The one or more still images may also comprise one or more avatars.

Another example of an individual stream of live or recorded content can comprise media data that includes an avatar of a user participating in the communication session along with audio data that captures the speech of the user. Yet another example of an individual stream of live or recorded content can comprise media data that includes a file displayed on a display screen along with audio data that captures the speech of a user. Accordingly, the various streams of live or recorded content within the communication data enable a remote meeting to be facilitated between a group of people and the sharing of content within the group of people. In some implementations, the various streams of live or recorded content within the communication data may originate from a plurality of co-located video cameras, positioned in a space, such as a room, to record or stream live a presentation that includes one or more individuals presenting and one or more individuals consuming presented content.

A participant or attendee can view content of the communication session 603 live as activity occurs, or alternatively, via a recording at a later time after the activity occurs. In the examples described herein, client computing devices 606(1) through 606(N) participating in the communication session 603 are configured to receive and render for display, on a user interface of a display screen, communication data. The communication data can comprise a collection of various instances, or streams, of live and/or recorded content. For example, an individual stream of content can comprise media data associated with a video feed (e.g., audio and visual data that capture the appearance and speech of a user participating in the communication session). Another example of an individual stream of content can comprise media data that includes an avatar of a user participating in the conference session along with audio data that captures the speech of the user. Yet another example of an individual stream of content can comprise media data that includes a content item displayed on a display screen and/or audio data that captures the speech of a user. Accordingly, the various streams of content within the communication data enable a meeting or a broadcast presentation to be facilitated amongst a group of people dispersed across remote locations.

A participant or attendee to a communication session is a person that is in range of a camera, or other image and/or audio capture device such that actions and/or sounds of the person which are produced while the person is viewing and/or listening to the content being shared via the communication session can be captured (e.g., recorded). For instance, a participant may be sitting in a crowd viewing the shared content live at a broadcast location where a stage presentation occurs. Or a participant may be sitting in an office conference room viewing the shared content of a communication session with other colleagues via a display screen. Even further, a participant may be sitting or standing in front of a personal device (e.g., tablet, smartphone, computer, etc.) viewing the shared content of a communication session alone in their office or at home.

The system 602 of FIG. 8 includes device(s) 610. The device(s) 610 and/or other components of the system 602 can include distributed computing resources that communicate with one another and/or with the client computing devices 606(1) through 606(N) via the one or more network(s) 608. In some examples, the system 602 may be an independent system that is tasked with managing aspects of one or more communication sessions such as communication session 603. As an example, the system 602 may be managed by entities such as SLACK, WEBEX, GOTOMEETING, GOOGLE HANGOUTS, etc.

Network(s) 608 may include, for example, public networks such as the Internet, private networks such as an institutional and/or personal intranet, or some combination of private and public networks. Network(s) 608 may also include any type of wired and/or wireless network, including but not limited to local area networks ("LANs"), wide area networks ("WANs"), satellite networks, cable networks, Wi-Fi networks, WiMax networks, mobile communications networks (e.g., 3G, 4G, and so forth) or any combination thereof. Network(s) 608 may utilize communications protocols, including packet-based and/or datagram-based protocols such as Internet protocol ("IP"), transmission control protocol ("TCP"), user datagram protocol ("UDP"), or other types of protocols. Moreover, network(s) 608 may also include a number of devices that facilitate network communications and/or form a hardware basis for the networks, such as switches, routers, gateways, access points, firewalls, base stations, repeaters, backbone devices, and the like.

In some examples, network(s) 608 may further include devices that enable connection to a wireless network, such as a wireless access point ("WAP"). Examples support connectivity through WAPs that send and receive data over various electromagnetic frequencies (e.g., radio frequencies), including WAPs that support Institute of Electrical and Electronics Engineers ("IEEE") 802.11 standards (e.g., 802.11g, 802.11n, 802.11ac and so forth), and other standards.

In various examples, device(s) 610 may include one or more computing devices that operate in a cluster or other grouped configuration to share resources, balance load, increase performance, provide fail-over support or redundancy, or for other purposes. For instance, device(s) 610 may belong to a variety of classes of devices such as traditional server-type devices, desktop computer-type devices, and/or mobile-type devices. Thus, although illustrated as a single type of device or a server-type device, device(s) 610 may include a diverse variety of device types and are not limited to a particular type of device. Device(s) 610 may represent, but are not limited to, server computers, desktop computers, web-server computers, personal computers, mobile computers, laptop computers, tablet computers, or any other sort of computing device.

A client computing device (e.g., one of client computing device(s) 606(1) through 606(N)) (each of which are also referred to herein as a "data processing system") may belong to a variety of classes of devices, which may be the same as, or different from, device(s) 610, such as traditional client-type devices, desktop computer-type devices, mobile-type devices, special purpose-type devices, embedded-type devices, and/or wearable-type devices. Thus, a client computing device can include, but is not limited to, a desktop computer, a game console and/or a gaming device, a tablet computer, a personal data assistant ("PDA"), a mobile phone/tablet hybrid, a laptop computer, a telecommunication device, a computer navigation type client computing device such as a satellite-based navigation system including a global positioning system ("GPS") device, a wearable device, a virtual reality ("VR") device, an augmented reality ("AR") device, an implanted computing device, an automotive computer, a network-enabled television, a thin client, a terminal, an Internet of Things ("IoT") device, a work station, a media player, a personal video recorder ("PVR"), a set-top box, a camera, an integrated component (e.g., a peripheral device) for inclusion in a computing device, an appliance, or any other sort of computing device. Moreover, the client computing device may include a combination of the earlier listed examples of the client computing device such as, for example, desktop computer-type devices or a mobile-type device in combination with a wearable device, etc.

Client computing device(s) 606(1) through 606(N) of the various classes and device types can represent any type of computing device having one or more data processing unit(s) 692 operably connected to computer-readable media 694 such as via a bus 616, which in some instances can include one or more of a system bus, a data bus, an address bus, a PCI bus, a Mini-PCI bus, and any variety of local, peripheral, and/or independent buses.

Executable instructions stored on computer-readable media 694 may include, for example, an operating system 619, a client module 620, a profile module 622, and other modules, programs, or applications that are loadable and executable by data processing units(s) 692.

Client computing device(s) 606(1) through 606(N) may also include one or more interface(s) 624 to enable communications between client computing device(s) 606(1) through 606(N) and other networked devices, such as device(s) 610, over network(s) 608. Such network interface(s) 624 may include one or more network interface controllers (NICs) or other types of transceiver devices to send and receive communications and/or data over a network. Moreover, client computing device(s) 606(1) through 606(N) can include input/output ("I/O") interfaces (devices) 626 that enable communications with input/output devices such as user input devices including peripheral input devices (e.g., a game controller, a keyboard, a mouse, a pen, a voice input device such as a microphone, a video camera for obtaining and providing video feeds and/or still images, a touch input device, a gestural input device, and the like) and/or output devices including peripheral output devices (e.g., a display, a printer, audio speakers, a haptic output device, and the like). FIG. 8 illustrates that client computing device 606(1) is in some way connected to a display device (e.g., a display screen 629(N)), which can display a UI according to the techniques described herein.

In the example environment 600 of FIG. 8, client computing devices 606(1) through 606(N) may use their respective client modules 620 to connect with one another and/or other external device(s) in order to participate in the communication session 603, or in order to contribute activity to a collaboration environment. For instance, a first user may utilize a client computing device 606(1) to communicate with a second user of another client computing device 606(2). When executing client modules 620, the users may share data, which may cause the client computing device 606(1) to connect to the system 602 and/or the other client computing devices 606(2) through 606(N) over the network(s) 608.

The client computing device(s) 606(1) through 606(N) may use their respective profile modules 622 to generate participant profiles (not shown in FIG. 8) and provide the participant profiles to other client computing devices and/or to the device(s) 610 of the system 602. A participant profile may include one or more of an identity of a user or a group of users (e.g., a name, a unique identifier ("ID"), etc.), user data such as personal data, machine data such as location (e.g., an IP address, a room in a building, etc.) and technical capabilities, etc. Participant profiles may be utilized to register participants for communication sessions.

As shown in FIG. 8, the device(s) 610 of the system 602 include a server module 630 and an output module 632. In this example, the server module 630 is configured to receive, from individual client computing devices such as client computing devices 606(1) through 606(N), media streams 634(1) through 634(N). As described above, media streams can comprise a video feed (e.g., audio and visual data associated with a user), audio data which is to be output with a presentation of an avatar of a user (e.g., an audio only experience in which video data of the user is not transmitted), text data (e.g., text messages), file data and/or screen sharing data (e.g., a document, a slide deck, an image, a video displayed on a display screen, etc.), and so forth. Thus, the server module 630 is configured to receive a collection of various media streams 634(1) through 634(N) during a live viewing of the communication session 603 (the collection being referred to herein as "media data 634"). In some scenarios, not all of the client computing devices that participate in the communication session 603 provide a media stream. For example, a client computing device may only be a consuming, or a "listening", device such that it only receives content associated with the communication session 603 but does not provide any content to the communication session 603.

In various examples, the server module 630 can select aspects of the media streams 634 that are to be shared with individual ones of the participating client computing devices 606(1) through 606(N). Consequently, the server module 630 may be configured to generate session data 636 based on the streams 634 and/or pass the session data 636 to the output module 632. Then, the output module 632 may communicate communication data 639 to the client computing devices (e.g., client computing devices 606(1) through 606(3) participating in a live viewing of the communication session). The communication data 639 may include video, audio, and/or other content data, provided by the output module 632 based on content 650 associated with the output module 632 and based on received session data 636. The content 650 can include the streams 634 or other shared data, such as an image file, a spreadsheet file, a slide deck, a document, etc. The streams 634 can include a video component depicting images captured by an I/O device 626 on each client computer. The content 650 also include input data from each user, which can be used to control a direction and location of a representation. The content can also include instructions for sharing data and identifiers for recipients of the shared data. Thus, the content 650 is also referred to herein as input data 650 or an input 650.

As shown, the output module 632 transmits communication data 639(1) to client computing device 606(1), and transmits communication data 639(2) to client computing device 606(2), and transmits communication data 639(3) to client computing device 606(3), etc. The communication data 639 transmitted to the client computing devices can be the same or can be different (e.g., positioning of streams of content within a user interface may vary from one device to the next).

In various implementations, the device(s) 610 and/or the client module 620 can include GUI presentation module 640. The GUI presentation module 640 may be configured to analyze communication data 639 that is for delivery to one or more of the client computing devices 606. Specifically, the UI presentation module 640, at the device(s) 610 and/or the client computing device 606, may analyze communication data 639 to determine an appropriate manner for displaying video, image, and/or content on the display screen 629 of an associated client computing device 606. In some implementations, the GUI presentation module 640 may provide video, image, and/or content to a presentation GUI 646 rendered on the display screen 629 of the associated client computing device 606. The presentation GUI 646 may be caused to be rendered on the display screen 629 by the GUI presentation module 640. The presentation GUI 646 may include the video, image, and/or content analyzed by the GUI presentation module 640.

In some implementations, the presentation GUI 646 may include a plurality of sections or grids that may render or comprise video, image, and/or content for display on the display screen 629. For example, a first section of the presentation GUI 646 may include a video feed of a presenter or individual, a second section of the presentation GUI 646 may include a video feed of an individual consuming meeting information provided by the presenter or individual. The GUI presentation module 640 may populate the first and second sections of the presentation GUI 646 in a manner that properly imitates an environment experience that the presenter and the individual may be sharing.

In some implementations, the GUI presentation module 640 may enlarge or provide a zoomed view of the individual represented by the video feed in order to highlight a reaction, such as a facial feature, the individual had to the presenter. In some implementations, the presentation GUI 646 may include a video feed of a plurality of participants associated with a meeting, such as a general communication session. In other implementations, the presentation GUI 646 may be associated with a channel, such as a chat channel, enterprise Teams channel, or the like. Therefore, the presentation GUI 646 may be associated with an external communication session that is different from the general communication session.

Figure 9:
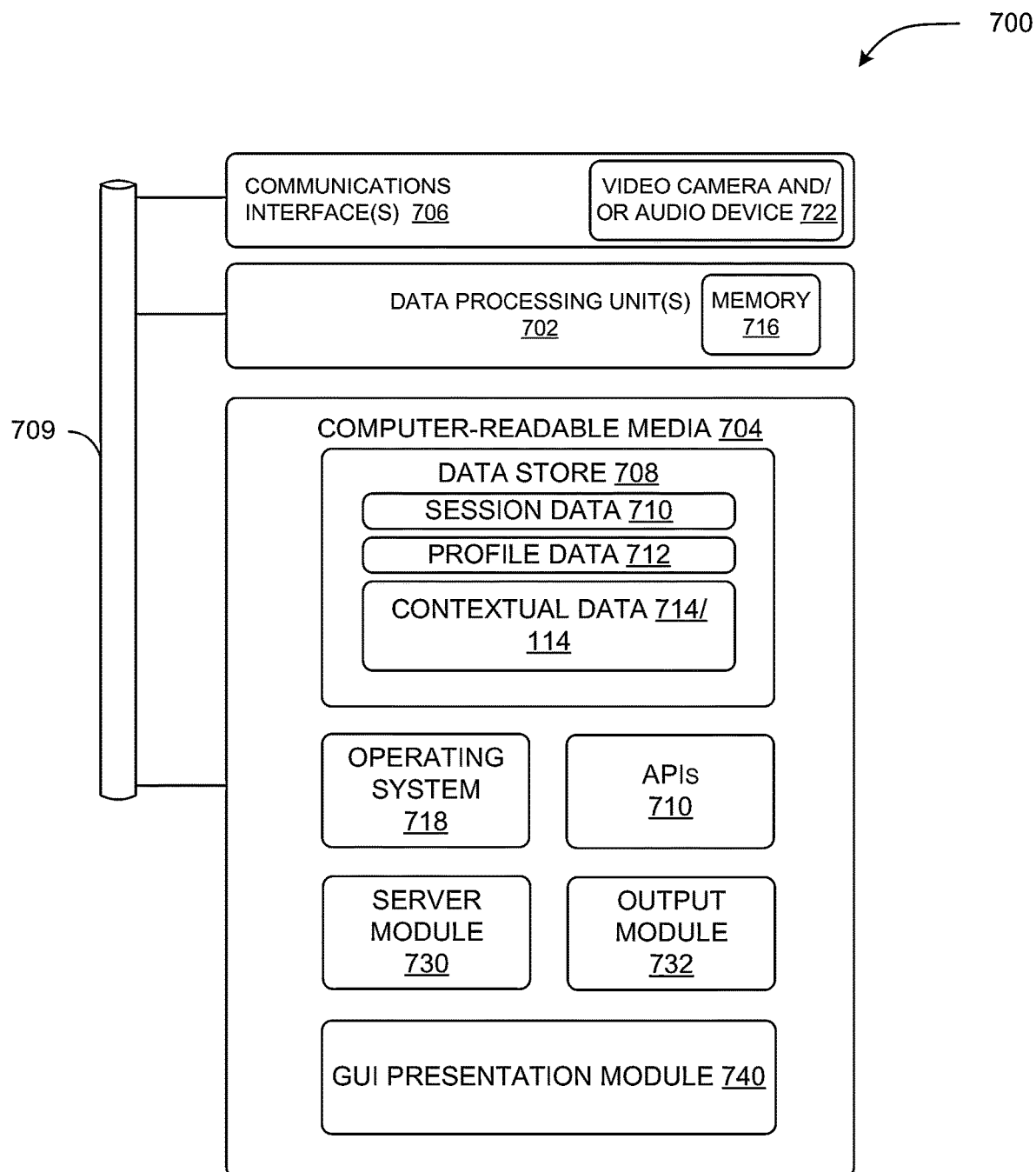
FIG. 9 is a computer architecture diagram illustrating a computing device architecture for a computing device capable of implementing aspects of the techniques and technologies presented herein.

FIG. 9 illustrates a diagram that shows example components of an example device 700 (also referred to herein as a "computing device") configured to generate data for some of the user interfaces disclosed herein. The device 700 may generate data that may include one or more sections that may render or comprise video, images, virtual objects, and/or content for display on the display screen 629. The device 700 may represent one of the device(s) described herein. Additionally, or alternatively, the device 700 may represent one of the client computing devices 606.

As illustrated, the device 700 includes one or more data processing unit(s) 702, computer-readable media 704, and communication interface(s) 706. The components of the device 700 are operatively connected, for example, via a bus 709, which may include one or more of a system bus, a data bus, an address bus, a PCI bus, a Mini-PCI bus, and any variety of local, peripheral, and/or independent buses.

As utilized herein, data processing unit(s), such as the data processing unit(s) 702 and/or data processing unit(s) 692, may represent, for example, a CPU-type data processing unit, a GPU-type data processing unit, a field-programmable gate array ("FPGA"), another class of DSP, or other hardware logic components that may, in some instances, be driven by a CPU. For example, and without limitation, illustrative types of hardware logic components that may be utilized include Application-Specific Integrated Circuits ("ASICs"), Application-Specific Standard Products ("ASSPs"), System-on-a-Chip Systems ("SOCs"), Complex Programmable Logic Devices ("CPLDs"), etc.

As utilized herein, computer-readable media, such as computer-readable media 704 and computer-readable media 694, may store instructions executable by the data processing unit(s). The computer-readable media may also store instructions executable by external data processing units such as by an external CPU, an external GPU, and/or executable by an external accelerator, such as an FPGA type accelerator, a DSP type accelerator, or any other internal or external accelerator. In various examples, at least one CPU, GPU, and/or accelerator is incorporated in a computing device, while in some examples one or more of a CPU, GPU, and/or accelerator is external to a computing device.

Computer-readable media, which might also be referred to herein as a computer-readable medium, may include computer storage media and/or communication media. Computer storage media may include one or more of volatile memory, nonvolatile memory, and/or other persistent and/or auxiliary computer storage media, removable and non-removable computer storage media implemented in any method or technology for storage of information such as computer-readable instructions, data structures, program modules, or other data. Thus, computer storage media includes tangible and/or physical forms of media included in a device and/or hardware component that is part of a device or external to a device, including but not limited to random access memory ("RAM"), static random-access memory ("SRAM"), dynamic random-access memory ("DRAM"), phase change memory ("PCM"), read-only memory ("ROM"), erasable programmable read-only memory ("EPROM"), electrically erasable programmable read-only memory ("EEPROM"), flash memory, compact disc read-only memory ("CD-ROM"), digital versatile disks ("DVDs"), optical cards or other optical storage media, magnetic cassettes, magnetic tape, magnetic disk storage, magnetic cards or other magnetic storage devices or media, solid-state memory devices, storage arrays, network attached storage, storage area networks, hosted computer storage or any other storage memory, storage device, and/or storage medium that can be used to store and maintain information for access by a computing device. The computer storage media can also be referred to herein as computer-readable storage media, non-transitory computer-readable storage media, non-transitory computer-readable medium, or computer storage medium.

In contrast to computer storage media, communication media may embody computer-readable instructions, data structures, program modules, or other data in a modulated data signal, such as a carrier wave, or other transmission mechanism. As defined herein, computer storage media does not include communication media. That is, computer storage media does not include communications media consisting solely of a modulated data signal, a carrier wave, or a propagated signal, per se.

Communication interface(s) 706 may represent, for example, network interface controllers ("NICs") or other types of transceiver devices to send and receive communications over a network. Furthermore, the communication interface(s) 706 may include one or more video cameras and/or audio devices 722 to enable generation of video feeds and/or still images, and so forth.

In the illustrated example, computer-readable media 704 includes a data store 708. In some examples, the data store 708 includes data storage such as a database, data warehouse, or other type of structured or unstructured data storage. In some examples, the data store 708 includes a corpus and/or a relational database with one or more tables, indices, stored procedures, and so forth to enable data access including one or more of hypertext markup language ("HTML") tables, resource description framework ("RDF") tables, web ontology language ("OWL") tables, and/or extensible markup language ("XML") tables, for example.

The data store 708 may store data for the operations of processes, applications, components, and/or modules stored in computer-readable media 704 and/or executed by data processing unit(s) 702 and/or accelerator(s). For instance, in some examples, the data store 708 may store session data 710 (e.g., session data 636 as shown in FIG. 8), profile data 712 (e.g., associated with a participant profile), and/or other data. The session data 710 can include a total number of participants (e.g., users and/or client computing devices) in a communication session, activity that occurs in the communication session, a list of invitees to the communication session, and/or other data related to when and how the communication session is conducted or hosted. The data store 708 may also include contextual data 714, such as the content that includes video, audio, or other content for rendering and display on one or more of the display screens 629. Hardware data 711 can define aspects of any device, such as a number of display screens of a computer. The contextual data 714 can define any type of activity or status related to the individual users 10A-10L each associated with individual video streams of a plurality of video streams 634. For instance, the contextual data can define a person's level in an organization, how each person's level relates to the level of others, a performance level of a person, or any other activity or status information that can be used to determine a position for a rendering of a person within a virtual environment. This contextual information can also be fed into any of the models to help bring emphasis to keywords spoken by a person at a specific level, highlight a UI when a background sound of a person at a certain level is detected, or change a sentiment display in a particular way when a person at a certain level is detected has a certain sentiment.

Alternately, some or all of the above-referenced data can be stored on separate memories 716 on board one or more data processing unit(s) 702 such as a memory on board a CPU-type processor, a GPU-type processor, an FPGA-type accelerator, a DSP-type accelerator, and/or another accelerator. In this example, the computer-readable media 704 also includes an operating system 718 and application programming interface(s) 710 (APIs) configured to expose the functionality and the data of the device 700 to other devices. Additionally, the computer-readable media 704 includes one or more modules such as the server module 730, the output module 732, and the GUI presentation module 740, although the number of illustrated modules is just an example, and the number may vary. That is, functionality described herein in association with the illustrated modules may be performed by a fewer number of modules or a larger number of modules on one device or spread across multiple devices.

The following clauses supplement the present disclosure.

Clause A: A method for controlling a viewing perspective of a three-dimensional environment (200) to follow relevant activity for a user (10J) participating in a communication session (604), the method configured for execution on a system, the method comprising: causing a display of a first user interface arrangement (101A) on a display device (629) associated with the user (10J), wherein the first user interface arrangement (101A) comprises individual renderings of three-dimensional representations (251A-251E) of a plurality of users (10A-10E) participating in the communication session with the user (10J), wherein each of the three-dimensional representations (251A-251E) have an independent position and an independent orientation within the three-dimensional environment (200) that are each controlled by input data provided by associated users of the plurality of users (10A-10E); An example is shown in FIG. 1A: display 3D avatars in a 3D virtual environment: the user is the user of the computer looking at the display; monitoring input data (650) from the plurality of users (10A-10E) participating in the communication session (604) with the user (10J), wherein the system monitors the input data (650) to determine when the input data (650) identifies the user (10J); monitoring user activity of the communication session to identify at least one input from a remote user controlling one of the displayed avatars, looks for input that identifies the user. Examples: (1) remote user states the user's name, (2) a remote user controls their avatar to look at the user, (3) a remote user shares data with the user; receiving the input data (650) that identifies the user (10J), wherein the input data (650) identifies the user (10J) is received from one or more computing devices (11A-11B) associated with a subset of users (10A-10B) that are each associated with a subset of one or more of the three-dimensional representations (251A-251B); an example is shown in FIG. 5B where the system can receive at least one user input from remote users directing a gesture toward the user's avatar or naming the user, e.g., one of the avatars looks in the direction of the user, a remote user mentions the user's name, a remote user shares a file; and in response to the input data (650) that identifies the user (10J), transitioning the first user interface arrangement (101A) comprising individual renderings of three-dimensional representations (251A-251E) of a plurality of users (10A-10E) participating in the communication session (604) to the second user interface arrangement (101B), wherein the second user interface arrangement (101B)

focuses on the subset of the one or more of the three-dimensional representations (251A-251B) associated with the subset of users (10A-10B), wherein focusing on the subset of the one or more of the three-dimensional representations (251A-251B) generates a visual or audio control differentiation between the subset of the one or more of the three-dimensional representations (251A-251B) from other three-dimensional representations (251C-251E) of other users of the plurality of users (10C-10E), an example of this is shown in FIG. 1B: the new UI focuses on the subset of avatars providing the input. This can include a UI that focuses on the avatars, which means zooming in on the relevant avatars and/or blurring other avatars.

Clause B: The method of any other Clause, wherein the second user interface arrangement focuses on the subset of the one or more of the three-dimensional representations by zooming into a viewing perspective that includes enlarged renderings of subset of the one or more of the three-dimensional representations and excludes the other three-dimensional representations of other users of the plurality of users. This is shown in FIG. 2B: Focused view by Zooming: viewing perspective zooms in on subject and exclude other users not in focus.

Clause C: The method of any other Clause, wherein the second user interface arrangement focuses on the subset of the one or more of the three-dimensional representations by obscuring renderings of other three-dimensional representations displayed in the first user interface arrangement, wherein the other three-dimensional representations exclude the subset of the one or more of the three-dimensional representations. FIG. 1B shows blurring the other avatars.

Clause D: The method of any other Clause, wherein the input data directs a position or an orientation of the one or more of the three-dimensional representations of the subset of users toward a representation of the user. FIGS. 5A-5C: other users look at the user Clause E: The method of any other Clause, wherein the input data includes at least one of an audio signal including a voice conversation that identifies the user, wherein transitioning the first user interface arrangement to the second user interface arrangement is invoked in response to receiving the audio signal including a voice conversation that identifies the user. FIGS. 1A-1B, 2A-2B: the user is mentioned in a conversation.

Clause E: The method of any other Clause, wherein the input for causing the transition includes input data directs a position or an orientation of a threshold number of the three-dimensional representations of the plurality of users toward a representation of the user, wherein the transition is invoked in response to determining that the input directs the position or the orientation of the threshold number of the three-dimensional representations of the plurality of users toward a representation of the user, wherein the subset of the three-dimensional representations is selected when the subset of the three-dimensional representations is within a predetermined distance form one another.

Clause F: The method of any other Clause, wherein the input for causing the transition includes an audio signal that identifies the user, wherein the transition is invoked in response to determining that the input that includes the audio signal that identifies the user, wherein the subset of the three-dimensional representations is selected when the subset of the three-dimensional representations is within a predetermined distance form one another.

In closing, although the various configurations have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

I claim:

1. A method for controlling a viewing perspective of an environment to selectively bring focus to relevant activity for a user participating in a communication session, the method configured for execution on a system, the method comprising:
   causing a display of a first user interface arrangement on a display device associated with the user, wherein the first user interface arrangement comprises individual renderings of representations of a plurality of users participating in the communication session with the user, wherein each of the representations have an independent position and an independent orientation within the three-dimensional environment that are each controlled by activity data provided by associated users of the plurality of users;
   monitoring the activity data from the plurality of users participating in the communication session with the user;
   determining that the activity data meets a preset condition associated with the user, wherein the activity data meets the preset condition associated with the user is received from one or more computing devices associated with a subset of users, and wherein the activity data meets the preset condition if a gesture of the subset of users meets the preset condition without an input from the user and the gesture is directed to the user or a representation of the user; and
   in response to determining that the activity data meets the preset condition associated with the user without the input from the user, wherein the activity data meets the preset condition if the gesture is directed to the user or the representation of the user, transitioning the first user interface arrangement comprising individual renderings of representations of the plurality of users participating in the communication session to a second user interface arrangement on the display device associated with the user, wherein the second user interface arrangement includes the display of the representations of the subset of users, and wherein the second user interface excludes or obscures the display of representations of other users that are not in the subset of users, by generating a visual or audio control differentiation between the subset of the one or more of the representations from other representations of other users of the plurality of users.

2. The method of claim 1, wherein the second user interface arrangement focuses on the subset of the one or more of the representations by zooming into a viewing perspective that includes enlarged renderings of subset of the one or more of the representations and excludes the other representations of other users of the plurality of users, wherein the subset of users are each associated with a subset of one or more of the representations.

3. The method of claim 1, wherein the second user interface arrangement focuses on the subset of the one or more of the representations by obscuring renderings of other representations displayed in the first user interface arrangement, wherein the other representations exclude the subset of the one or more of the representations.

4. The method of claim 1, wherein the activity data directs a position or an orientation of the one or more of the representations of the subset of users toward a representation of the user.

5. The method of claim 1, wherein the activity data includes at least one of an audio signal including a voice conversation that identifies the user, wherein transitioning the first user interface arrangement to the second user interface arrangement is invoked in response to receiving the audio signal including a voice conversation that identifies the user.

6. The method of claim 1, wherein the activity for causing the transition includes activity data directs a position or an orientation of a threshold number of the representations of the plurality of users toward a representation of the user, wherein the transition is invoked in response to determining that the activity data directs the position or the orientation of the threshold number of the representations of the plurality of users toward a representation of the user, wherein the subset of the representations is selected when the subset of the representations is within a predetermined distance form one another.

7. The method of claim 1, wherein the activity for causing the transition includes an audio signal that identifies the user, wherein the transition is invoked in response to determining that the activity that includes the audio signal that identifies the user, wherein the subset of the representations is selected when the subset of the representations is within a predetermined distance form one another.

8. The method of claim 1, wherein one or more users identified in the activity data is not a user providing the activity data, wherein the one or more users identified in the content is not the user.

9. The method of claim 1, wherein the gesture that is directed to the user or the representation of the user includes at least one of (1) one or more representations of the subset of users turning toward the representation of the user, (2) a communication of a file or text initiated from the subset of users directed to a computing device of the user, or (3) a verbal communication of the subset of users mentioning an identifier of the user.

10. A system for controlling a viewing perspective of an environment to focus a user interface display on relevant activity for a user participating in a communication session, the system comprising:
one or more processing units; and
a computer-readable storage medium having encoded thereon computer-executable instructions to cause the one or more processing units to perform a method comprising:
causing a display of a first user interface arrangement on a display device associated with the user, wherein the first user interface arrangement comprises individual renderings of representations of a plurality of users participating in the communication session with the user, wherein each of the representations have an independent position and an independent orientation within the three-dimensional environment that are each controlled by activity data provided by associated users of the plurality of users;
monitoring the activity data from the plurality of users participating in the communication session with the user;
determining that the activity data meets a preset condition associated with the user, wherein the activity data meets the preset condition associated with the user is received from one or more computing devices associated with a subset of users, and wherein the activity data meets the preset condition if a gesture of the subset of users meets the preset condition without an input from the user and the gesture is directed to the user or a representation of the user; and
in response to determining that the activity data meets the preset condition associated with the user without the input from the user, wherein the activity data meets the preset condition if the gesture is directed to the user or the representation of the user, transitioning the first user interface arrangement comprising individual renderings of representations of the plurality of users participating in the communication session to a second user interface arrangement on the display device associated with the user, wherein the second user interface arrangement includes the display of the representations of the subset of users, and wherein the second user interface excludes or obscures the display of representations of other users that are not in the subset of users, by generating a visual or audio control differentiation between the subset of the one or more of the three-dimensional representations from other representations of other users of the plurality of users.

11. The system of claim 10, wherein the second user interface arrangement focuses on the subset of the one or more of the representations by zooming into a viewing perspective that includes enlarged renderings of subset of the one or more of the representations and excludes the other representations of other users of the plurality of users.

12. The system of claim 10, wherein the activity data includes at least one of an audio signal including a voice conversation that identifies the user, wherein transitioning the first user interface arrangement to the second user interface arrangement is invoked in response to receiving the audio signal including a voice conversation that identifies the user.

13. The system of claim 10, wherein the activity for causing the transition includes an orientation of a threshold number of the representations of the plurality of users toward a representation of the user, wherein the transition is invoked in response to determining that the activity directs the position or the orientation of the threshold number of the representations of the plurality of users toward a representation of the user, wherein the subset of the representations is selected when the subset of the representations is within a predetermined distance form one another.

14. The system of claim 10, wherein the activity for causing the transition includes an audio signal that identifies the user, wherein the transition is invoked in response to determining that the activity that includes the audio signal that identifies the user, wherein the subset of the representations is selected when the subset of the representations is within a predetermined distance form one another.

15. A computer-readable storage medium having encoded thereon computer-executable instructions to cause one or more processing units of a system to perform a method for controlling a viewing perspective of an environment to focus a user interface display on relevant activity for a user participating in a communication session, the method comprising:
causing a display of a first user interface arrangement on a display device associated with the user, wherein the first user interface arrangement comprises individual renderings of representations of a plurality of users participating in the communication session with the user, wherein each of the representations have an independent position and an independent orientation within the three-dimensional environment that are each controlled by activity data provided by associated users of the plurality of users;

monitoring activity data from the plurality of users participating in the communication session with the user;

determining that the activity data meets a preset condition associated with the user, wherein the activity data meets the preset condition associated with the user is received from one or more computing devices associated with a subset of users, and wherein the activity data meets the preset condition if a gesture of the subset of users meets the preset condition without an input from the user and the gesture is directed to the user or a representation of the user; and in response to determining that the activity data meets the preset condition associated with the user without the input from the user, wherein the activity data meets the preset condition if the gesture is directed to the user or the representation of the user, transitioning the first user interface arrangement comprising individual renderings of representations of the plurality of users participating in the communication session to a second user interface arrangement on the display device associated with the user, wherein the second user interface arrangement includes the display of the representations of the subset of users, and wherein the second user interface excludes or obscures the display of representations of other users that are not in the subset of users, by generating a visual or audio control differentiation between the subset of the one or more of the three-dimensional representations from other representations of other users of the plurality of users.

16. The computer-readable storage medium of claim 15, wherein the second user interface arrangement focuses on the subset of the one or more of the representations by zooming into a viewing perspective that includes enlarged renderings of subset of the one or more of the representations and excludes the other representations of other users of the plurality of users.

17. The computer-readable storage medium of claim 15, wherein the second user interface arrangement focuses on the subset of the one or more of the representations by obscuring renderings of other representations displayed in the first user interface arrangement, wherein the other representations exclude the subset of the one or more of the representations.

18. The computer-readable storage medium of claim 15, wherein the activity data directs a position or an orientation of the one or more of the representations of the subset of users toward a representation of the user.

19. The computer-readable storage medium of claim 15, wherein the activity data includes at least one of an audio signal including a voice conversation that identifies the user, wherein transitioning the first user interface arrangement to the second user interface arrangement is invoked in response to receiving the audio signal including a voice conversation that identifies the user.

20. The computer-readable storage medium of claim 15, wherein the activity data for causing the transition includes an orientation of a threshold number of the representations of the plurality of users toward a representation of the user, wherein the transition is invoked in response to determining that the input directs the position or the orientation of the threshold number of the representations of the plurality of users toward a representation of the user, wherein the subset of the representations is selected when the subset of the representations is within a predetermined distance form one another.

\* \* \* \* \*